US009641122B2

(12) United States Patent
Romanowich et al.

(10) Patent No.: US 9,641,122 B2
(45) Date of Patent: May 2, 2017

(54) HVAC ACTUATOR WITH AUTOMATIC END STOP RECALIBRATION

(71) Applicant: Johnson Controls Technology Company, Holland, MI (US)

(72) Inventors: Gary A. Romanowich, Slinger, WI (US); Robert K. Alexander, Menomonee Falls, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/983,229

(22) Filed: Dec. 29, 2015

(65) Prior Publication Data
US 2016/0156299 A1 Jun. 2, 2016

Related U.S. Application Data

(63) Continuation-in-part of application No. 14/809,119, filed on Jul. 24, 2015, now Pat. No. 9,465,370, which
(Continued)

(51) Int. Cl.
*H02P 7/00* (2016.01)
*H02P 29/00* (2016.01)
(Continued)

(52) U.S. Cl.
CPC ....... *H02P 29/0033* (2013.01); *H02H 7/0838* (2013.01); *H02H 7/0852* (2013.01);
(Continued)

(58) Field of Classification Search
CPC .... H02P 29/0033; H02P 6/17; H02P 29/0241; H02P 29/40; H02P 29/60; H02P 6/085;
(Continued)

(56) References Cited

U.S. PATENT DOCUMENTS 3,624,475 A 11/1971 Smith
4,264,297 A * 4/1981 Van Berkum ............. F23N 1/02
236/15 BD
(Continued)

OTHER PUBLICATIONS

Notice of Allowance on U.S. Appl. No. 13/533,894, mail date Sep. 19, 2014, 8 pages.
(Continued)

*Primary Examiner* — Rita Leykin
(74) *Attorney, Agent, or Firm* — Foley & Lardner LLP

(57) ABSTRACT

An actuator in a HVAC system includes a motor and a drive device driven by the motor. The drive device is coupled to a movable HVAC component for driving the movable HVAC component between multiple positions. The actuator further includes a main actuator controller. The main actuator controller includes end stop location memory that stores one or more end stop locations indicating expected locations of the one or more end stops. The main actuator controller further includes an end stop location recalibrator that runs an automatic recalibration process to determine and set recalibrated end stop locations. The end stop location recalibrator runs the automatic calibration process in response to detecting that the drive device has unexpectedly stalled at a location other than a stored end stop location.

20 Claims, 22 Drawing Sheets

Related U.S. Application Data is a continuation-in-part of application No. 14/581,373, filed on Dec. 23, 2014, now Pat. No. 9,509,242, which is a continuation of application No. 13/533,894, filed on Jun. 26, 2012, now Pat. No. 8,947,031.

(51) Int. Cl.

| | | |
|---|---|---|
| *H02P 27/08* | (2006.01) | |
| *H02P 29/02* | (2016.01) | |
| *H02P 29/024* | (2016.01) | |
| *H02H 7/08* | (2006.01) | |
| *H02H 7/085* | (2006.01) | |
| *H02P 6/08* | (2016.01) | |
| *H02P 6/24* | (2006.01) | |
| *H02P 6/17* | (2016.01) | |
| *H02P 29/60* | (2016.01) | |
| *H02P 29/40* | (2016.01) | |
| *F24F 13/14* | (2006.01) | |

(52) U.S. Cl.
CPC ............... *H02P 6/085* (2013.01); *H02P 6/17* (2016.02); *H02P 6/24* (2013.01); *H02P 27/085* (2013.01); *H02P 29/02* (2013.01); *H02P 29/027* (2013.01); *H02P 29/0241* (2016.02); *H02P 29/40* (2016.02); *H02P 29/60* (2016.02); *F24F 2013/1433* (2013.01)

(58) Field of Classification Search
CPC ...... H02P 29/02; H02P 29/027; H02P 27/085; H02P 6/24; H02P 7/0852; H02H 7/0838; F24F 2013/1433
USPC .. 318/400.3, 466, 470, 469, 400.09, 400.03, 318/400.04, 400.06, 400.12
See application file for complete search history.

(56) References Cited

U.S. PATENT DOCUMENTS

| | | | |
|---|---|---|---|
| 4,588,936 A * | 5/1986 | Itoh | G05B 19/39 318/599 |
| 4,763,347 A | 8/1988 | Erdman | |
| 5,019,757 A | 5/1991 | Beifus | |
| 5,034,871 A | 7/1991 | Okamoto et al. | |
| 5,261,025 A | 11/1993 | Post et al. | |
| 5,448,141 A | 9/1995 | Kelley et al. | |
| 5,675,231 A | 10/1997 | Becerra et al. | |
| 5,744,923 A * | 4/1998 | Strauss | H02J 9/061 318/430 |
| 5,744,927 A | 4/1998 | Hayashida | |
| 5,825,597 A | 10/1998 | Young | |
| 6,070,660 A * | 6/2000 | Byrnes | F04D 27/00 165/244 |
| 6,173,902 B1 | 1/2001 | Bauer et al. | |
| 6,442,644 B1 * | 8/2002 | Gustavson | G06F 13/4243 365/194 |
| 6,491,094 B2 * | 12/2002 | Rayburn | F24F 3/044 165/208 |
| 6,495,981 B2 * | 12/2002 | Romanowich | B60H 1/00835 318/434 |
| 6,522,093 B1 * | 2/2003 | Hsu | H02P 6/30 318/400.01 |
| 6,624,606 B2 | 9/2003 | Kushida et al. | |
| 6,647,325 B2 * | 11/2003 | Shimazaki | B60L 11/1807 180/65.1 |
| 6,725,132 B2 | 4/2004 | Frankel et al. | |
| 6,768,100 B1 * | 7/2004 | Brown | G01D 5/34 250/230 |
| 6,820,409 B2 | 11/2004 | Braun | |
| 6,940,241 B2 | 9/2005 | Lange et al. | |
| 7,012,393 B2 | 3/2006 | De Frutos et al. | |
| 7,021,072 B2 * | 4/2006 | McMillan | F24F 13/1426 361/152 |
| 7,116,070 B2 * | 10/2006 | MacKay | H02P 8/34 318/400.11 |
| 7,177,534 B2 | 2/2007 | Jones et al. | |
| 7,181,954 B2 | 2/2007 | Horie | |
| 7,265,512 B2 | 9/2007 | McMillan et al. | |
| 7,590,334 B2 | 9/2009 | Yabusaki et al. | |
| 8,084,982 B2 * | 12/2011 | Grabinger | F16K 31/046 318/558 |
| 8,395,338 B2 | 3/2013 | Kuroda et al. | |
| 8,606,016 B2 | 12/2013 | Hou et al. | |
| 8,786,234 B2 * | 7/2014 | Kuster | G05B 19/402 318/438 |
| 8,947,031 B1 | 2/2015 | Diamond et al. | |
| 2002/0121872 A1 * | 9/2002 | Boisvert | B60J 7/0573 318/469 |
| 2003/0063900 A1 | 4/2003 | Wang et al. | |
| 2004/0105664 A1 | 6/2004 | Ivankovic | |
| 2008/0051024 A1 * | 2/2008 | Caliendo | A62C 2/14 454/369 |
| 2012/0290136 A1 | 11/2012 | Romanowich et al. | |
| 2015/0108933 A1 | 4/2015 | Diamond et al. | |

OTHER PUBLICATIONS

Office Action on U.S. Appl. No. 13/533,894, mail date Jun. 6, 2014, 8 pages.

\* cited by examiner

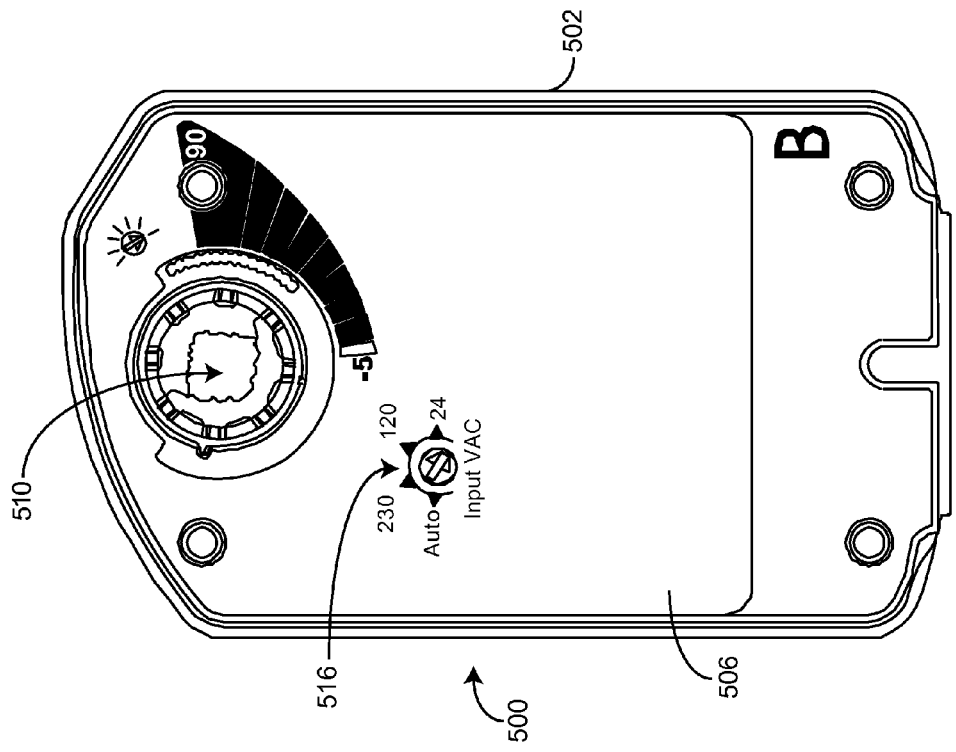
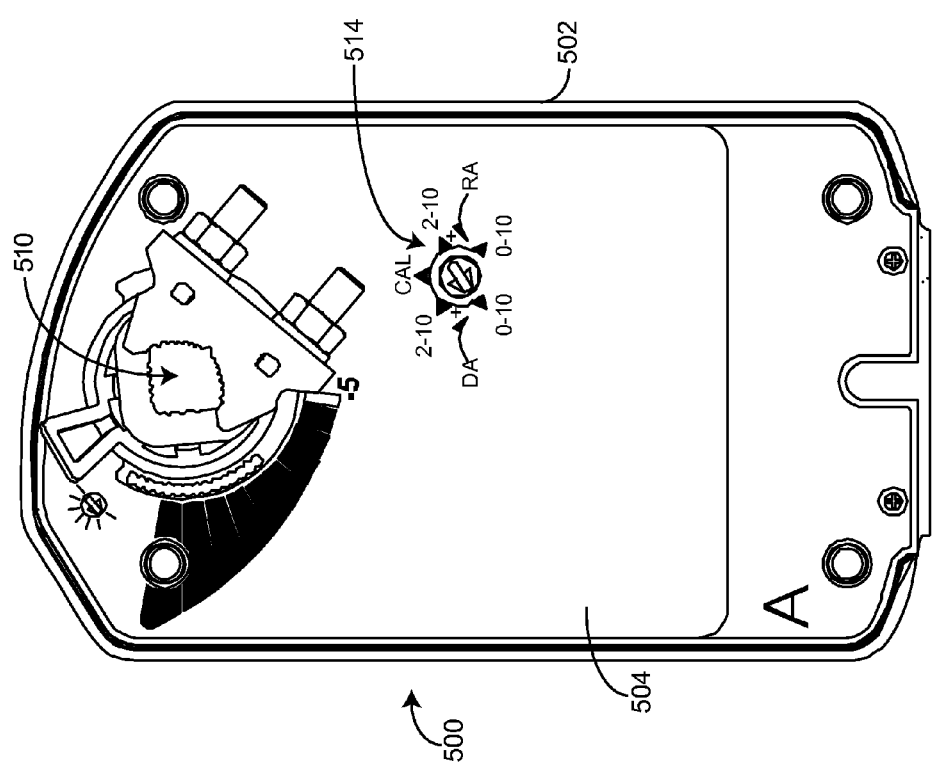
FIG. 6
FIG. 7

HVAC ACTUATOR WITH AUTOMATIC END STOP RECALIBRATION

CROSS-REFERENCE TO RELATED PATENT APPLICATIONS

This application is a continuation-in-part of U.S. patent application Ser. No. 14/809,119, filed Jul. 24, 2015, which is a continuation-in-part of U.S. patent application Ser. No. 14/581,373, filed Dec. 23, 2014, which is a continuation of U.S. patent application Ser. No. 13/533,894, filed Jun. 26, 2012. The entire disclosures of U.S. patent application Ser. No. 14/809,119, U.S. patent application Ser. No. 14/581,373, and U.S. patent application Ser. No. 13/533,894 are incorporated by reference herein.

BACKGROUND

The present invention relates generally to actuators in a heating, ventilating, or air conditioning (HVAC) system and more particularly to HVAC actuators that use brushless direct current (BLDC) motors.

HVAC actuators are used to operate a wide variety of HVAC components such as air dampers, fluid valves, air handling units, and other components that are typically used in HVAC systems. For example, an actuator may be coupled to a damper in a HVAC system and may be used to drive the damper between an open position and a closed position. A HVAC actuator typically includes a motor and a drive device (e.g., a hub, a drive train, etc.) that is driven by the motor and coupled to the HVAC component.

Some HVAC actuators include mechanical end stops that define the ends of a range of movement of the drive device and/or the HVAC component. When the drive device encounters an unexpected end stop, the drive device and connected components may experience an impulse force that can cause premature breakage. For example, an unexpected end stop may occur when ice or other debris restricts the range of movement of the drive device and prevents it from reaching the expected end stop location. Existing solutions to this problem generally involve an operator recognizing that the drive device has unexpectedly stalled and initiating an automatic recalibration process to redefine the end stop locations. However, these solutions are unsatisfactory because they rely on the operator initiating the automatic calibration procedure in order to prevent damaging impulse forces at the mechanical end stops.

SUMMARY

One implementation of the present disclosure is an actuator in a HVAC system. The actuator includes a motor and a drive device driven by the motor. The drive device is coupled to a movable HVAC component for driving the movable HVAC component between multiple positions bounded by one or more end stops. The actuator further includes a main actuator controller that determines when the drive device is approaching an end stop. The main actuator controller includes end stop location memory that stores one or more end stop locations indicating expected locations of the one or more end stops. The main actuator controller further includes an end stop location recalibrator that runs an automatic recalibration process to determine and set recalibrated end stop locations in response to detecting that the drive device has unexpectedly stalled at a location other than a stored end stop location.

In some embodiments, the drive device unexpectedly stalls prior to reaching a stored end stop location. In some embodiments, the drive device proceeds through a stored end stop location and unexpectedly stalls at a location beyond the stored end stop location.

In some embodiments, the main actuator controller includes a stall detector that detects when the drive device has stalled and records the location of the drive device at stall. In some embodiments, the main actuator controller includes a comparator that compares the stored end stop locations to the location of the drive device at stall. The comparator may automatically initiate an automatic recalibration process in response to a determination that the location of the drive device at stall does not match any of the stored end stop locations.

In some embodiments, the main actuator controller includes a stroke respanner that calculates an adjusted stroke length of the actuator based on the recalibrated end stop locations. In some embodiments, the main actuator controller includes a setpoint adjuster that receives an actuator position setpoint and adjusts the actuator position setpoint based on the adjusted stroke length.

In some embodiments, the actuator includes one or more position sensors that measure a position of at least one of the drive device, the motor, and the movable HVAC component. The main controller may determine that the drive device is approaching an stored end stop location using feedback from the position sensors.

In some embodiments, the actuator includes a threshold calculator that receives the stored end stop location from the end stop location memory and generates a soft stall threshold using the expected end stop location. In some embodiments, the actuator includes a comparator that compares the measured position with the soft stall threshold and generates a soft stall signal indicating the drive device is approaching the stored end stop location in response to the measured position reaching the soft stall threshold.

Another implementation of the present disclosure is a method for controlling a HVAC actuator. The HVAC actuator includes a motor and a drive device driven by the motor and coupled to a movable HVAC component. The method involves operating the motor to drive the movable HVAC component between multiple positions bounded by one or more end stops. The method involves retrieving stored end stop locations from end stop location memory. The method includes automatically initiating an automatic calibration procedure in response to an unexpected end stop. The method includes identifying and setting recalibrated end stop positions.

In some embodiments, the method includes detecting when the drive device unexpectedly stalls prior to reaching a stored end stop location. In some embodiments, the method includes detecting when the drive device proceeds through a stored end stop location and unexpectedly stalls at a location beyond the stored end stop location.

In some embodiments, the method includes detecting that the drive device has encountered an unexpected end stop by determining when the drive device has stalled and recording the location of the drive device at stall. In some embodiments, the method includes comparing the stored end stop locations to the location of the drive device at stall and automatically initiating an automatic recalibration process in response to a determination that the locations do not match.

In some embodiments, the method includes recalculating an adjusted stroke length of the actuator based on the recalibrated end stop locations. In some embodiments, the method includes receiving an actuator position setpoint and adjusting the actuator position setpoint input based on the adjusted stroke length.

In some embodiments, the method includes using one or more position sensors to measure a position of at least one of the drive device, the motor, and the movable HVAC component. In some embodiments, determining that the drive device is approaching the stored end stop location includes using feedback from the position sensors.

In some embodiments, the method includes using the location of the stored end stop to generate a soft stall threshold. The method may include comparing the measured position with the soft stall threshold. The method may include generating a soft stall signal indicating that the drive device is approaching the stored end stop location in response to the measured position reaching the soft stall threshold.

Another implementation of the present disclosure is an actuator in a HVAC system. The actuator includes a motor and a drive device driven by the motor. The drive device is coupled to a movable HVAC component for driving the movable HVAC component between multiple positions bounded by one or more end stops. The actuator includes a processing circuit including a processor and memory. The memory stores one or more end stop locations indicating expected locations of the one or more end stops. The processing circuit runs an automatic recalibration process to determine and set recalibrated end stop locations in response to detecting that the drive device has unexpectedly stalled at a location other than a stored end stop location.

Another implementation of the present disclosure is a method for controlling a HVAC actuator. The HVAC actuator includes a motor and a drive device driven by the motor. The drive device is coupled to a movable HVAC component. The method may be performed by a processing circuit of the actuator including a processor and memory. The method includes operating the motor to drive the movable HVAC component between multiple positions bounded by one or more end stops. The method includes retrieving stored end stop locations from the memory of the actuator. The method includes automatically initiating an automatic recalibration process to determine and set recalibrated end stop locations in response to detecting that the drive device has unexpectedly stalled at a location other than a stored end stop location.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 5-7 are drawings of an actuator which may be used in the HVAC system of FIG. 1, the waterside system of FIG. 2, the airside system of FIG. 3, or the BMS of FIG. 4 to control a HVAC component, according to an exemplary embodiment.

5-7 when the stroke length is longer than expected, according to an exemplary embodiment.

DETAILED DESCRIPTION

Referring generally to the FIGURES, a HVAC actuator with soft stall control is shown, according to an exemplary embodiment. The actuator may be a damper actuator, a valve actuator, a fan actuator, a pump actuator, or any other type of actuator that can be used in a HVAC system.

The actuator includes a motor and a drive device driven by the motor. In some embodiments, the motor is a brushless direct current (BLDC) motor. The drive device is coupled to a movable HVAC component for driving the movable HVAC component between multiple positions. The actuator further includes a main actuator controller and a pulse width modulation (PWM) speed controller. The main actuator controller may determine an appropriate speed setpoint for the motor and may provide the speed setpoint to the PWM speed controller. The PWM speed controller may generate a PWM output having a duty cycle based on the speed setpoint and may provide the PWM output to the motor (e.g., via a motor drive inverter).

The actuator is configured to perform a soft stall process when approaching an end stop. The main actuator controller determines when the drive device is approaching an end stop. The PWM speed controller sets the PWM output to zero in response to a determination that the drive device is approaching the end stop. Setting the PWM output to zero stops motor commutation and causes the drive device to stop before reaching the end stop. The PWM speed controller then increases the PWM speed output until the end stop is reached, thereby causing the speed of the motor to increase as the drive device approaches the end stop.

Unlike conventional techniques which merely slow down the speed of the motor as the drive device approaches an end stop, the soft stall process described herein completely stops motor commutation. Once the motor has completely stopped, the main actuator controller causes the PWM output provided to the motor to increase (e.g., ramp-up), which increases the speed of the motor until the mechanical end of travel is reached. As such, the main actuator controller does not slow down the speed of the motor while approaching an end stop, but rather completely stops the motor and then increases the speed of the motor until the end stop is reached. Advantageously, the soft stall process described herein substantially reduces the impulse force seen at the mechanical end stop relative to conventional motor slowing techniques. The soft stall process may increase the longevity of the mechanical gear train and other actuator components without the need to change the physical design of the actuator.

Building Management System and HVAC System

Figure 1:
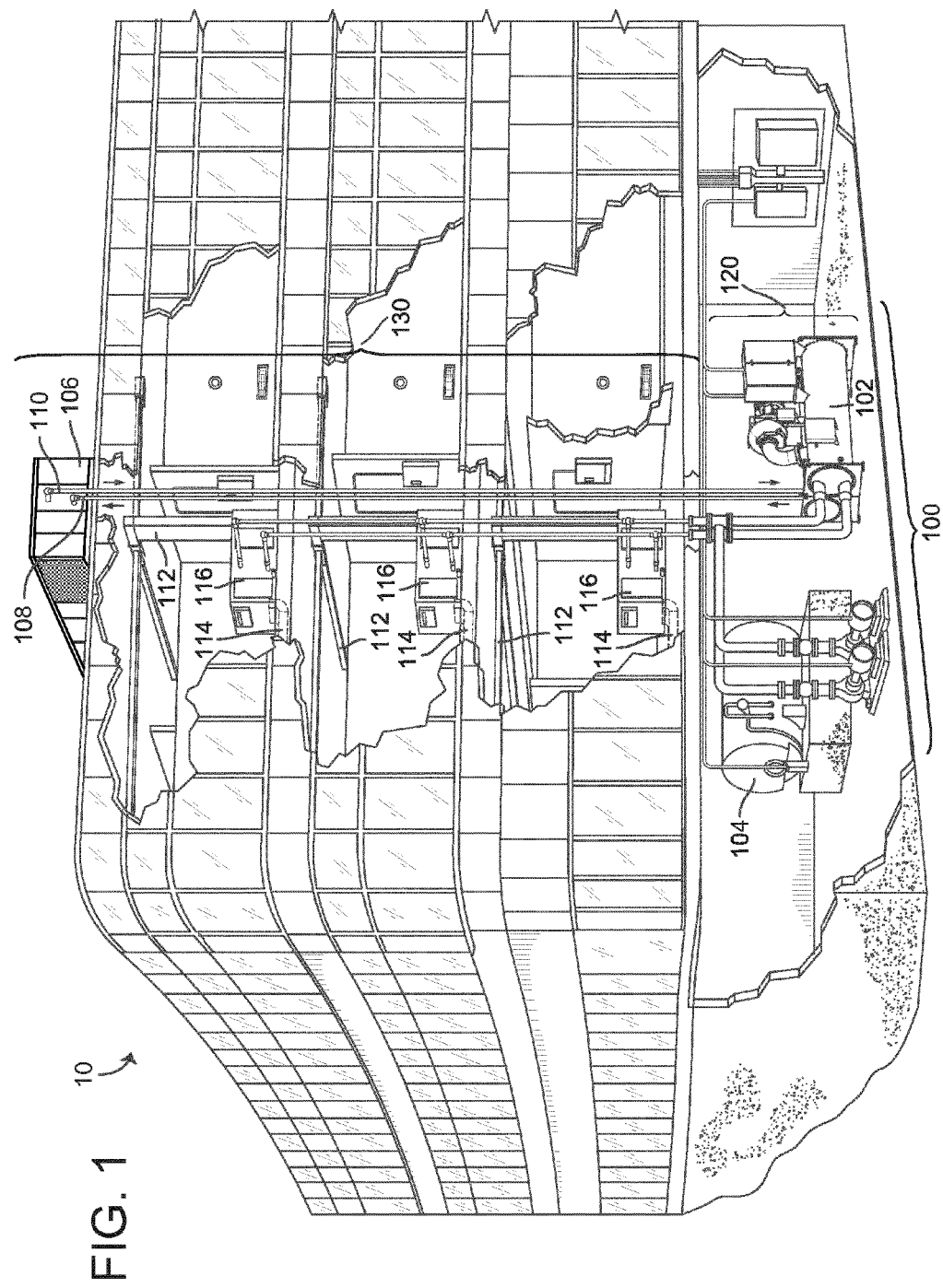
FIG. 1 is a drawing of a building equipped with a heating, ventilating, or air conditioning (HVAC) system and a building management system (BMS), according to an exemplary embodiment.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
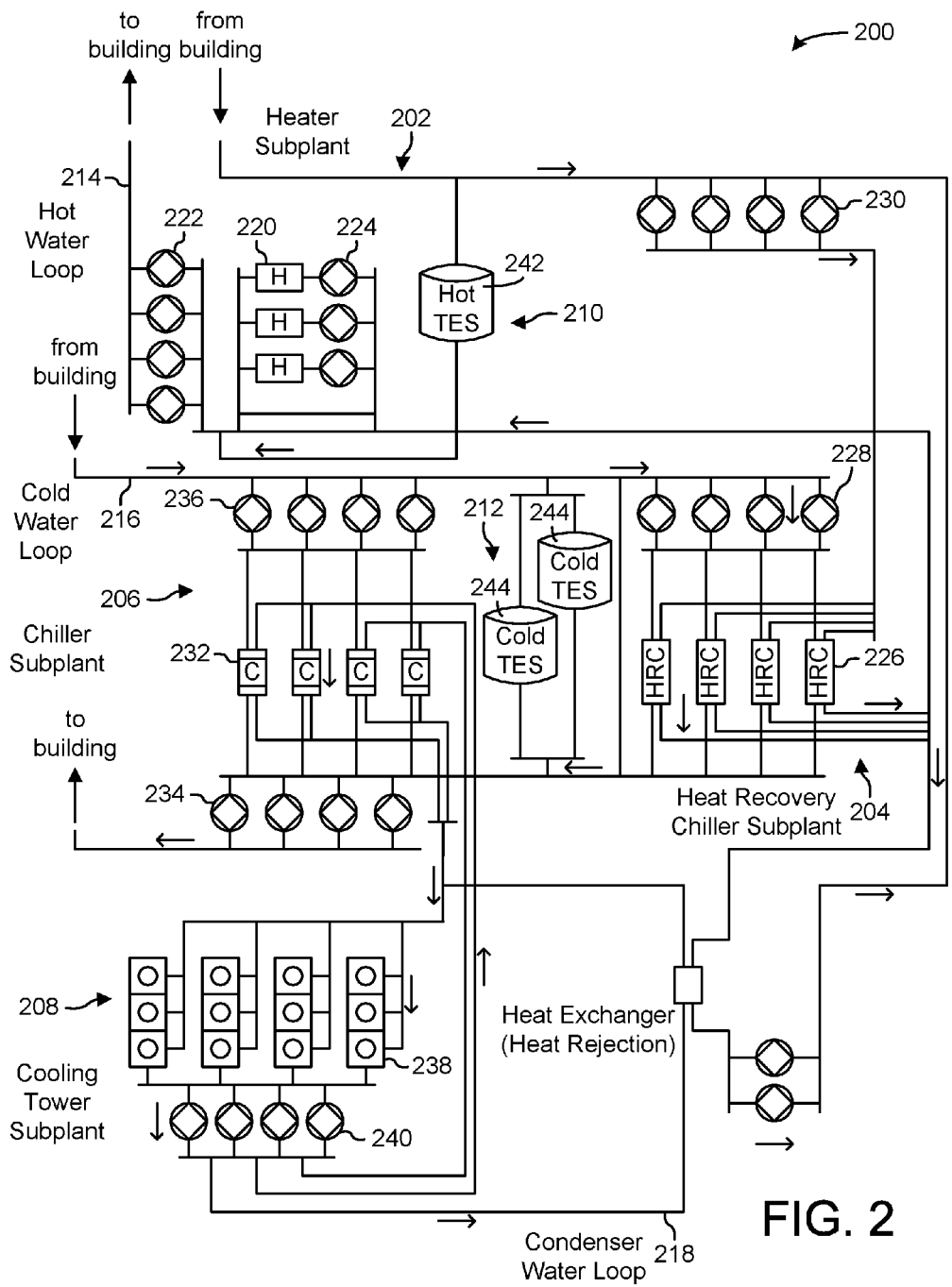
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
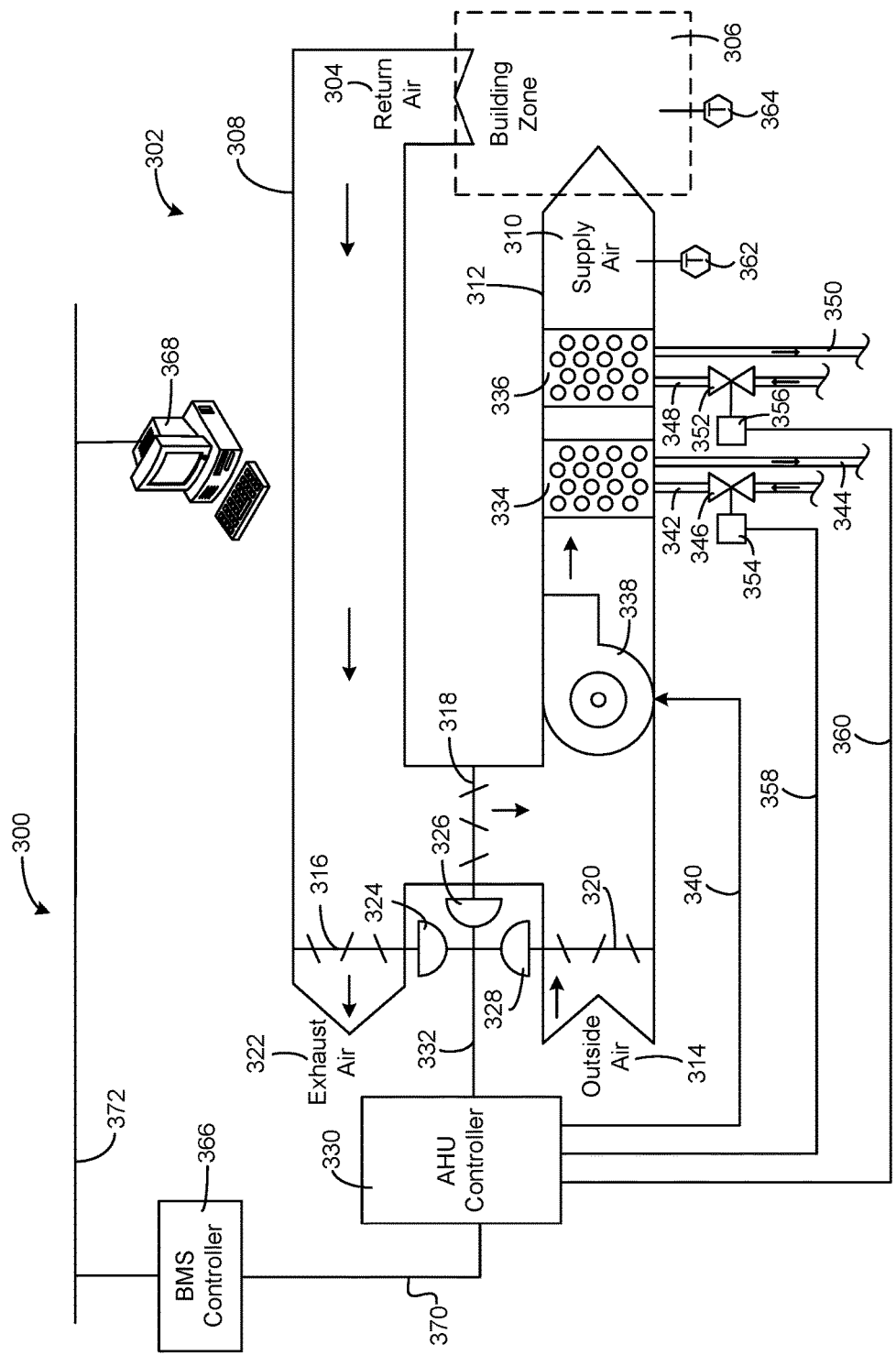
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
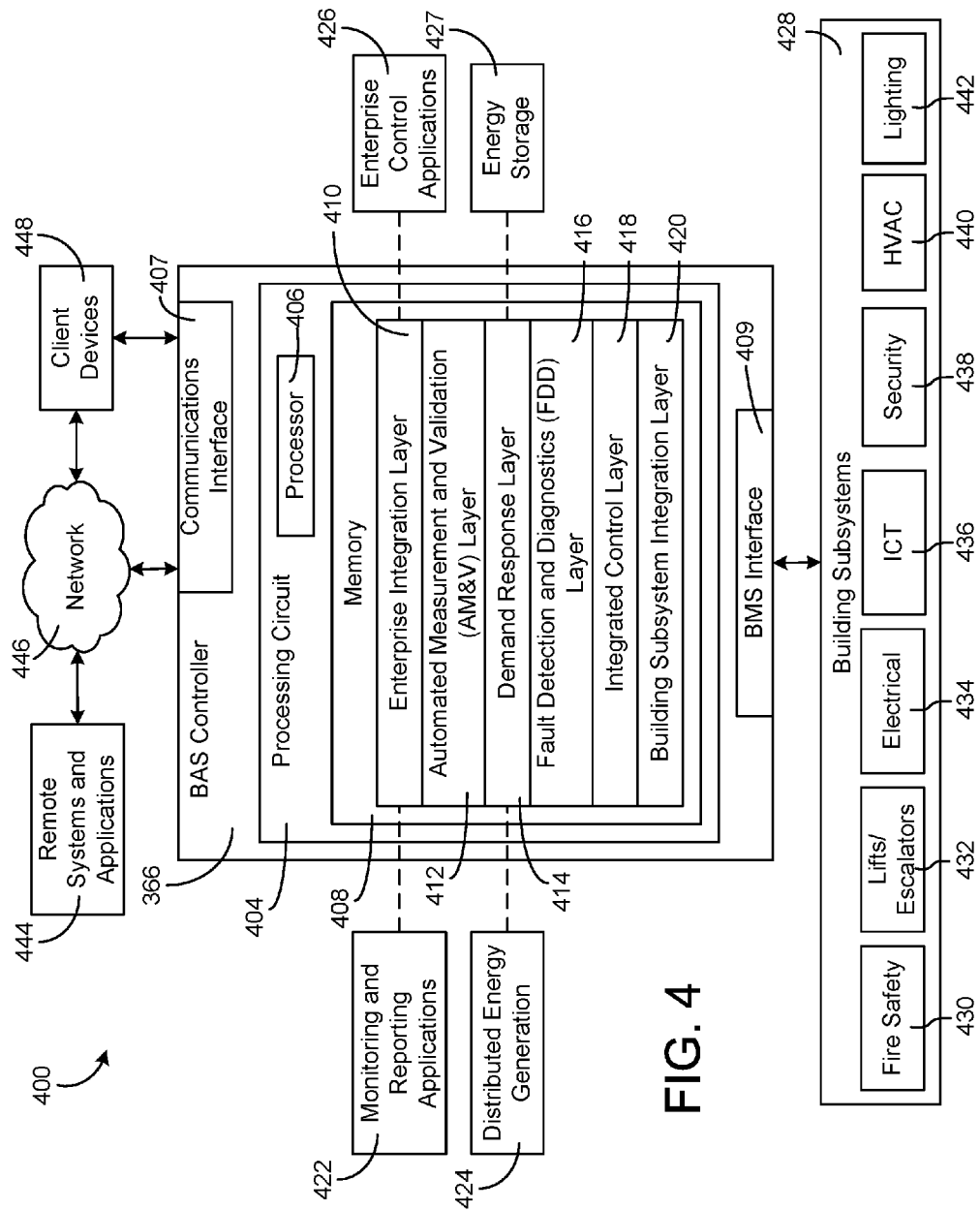
FIG. 4 is a block diagram of a BMS which may be implemented in the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

HVAC Actuator

Figure 5:
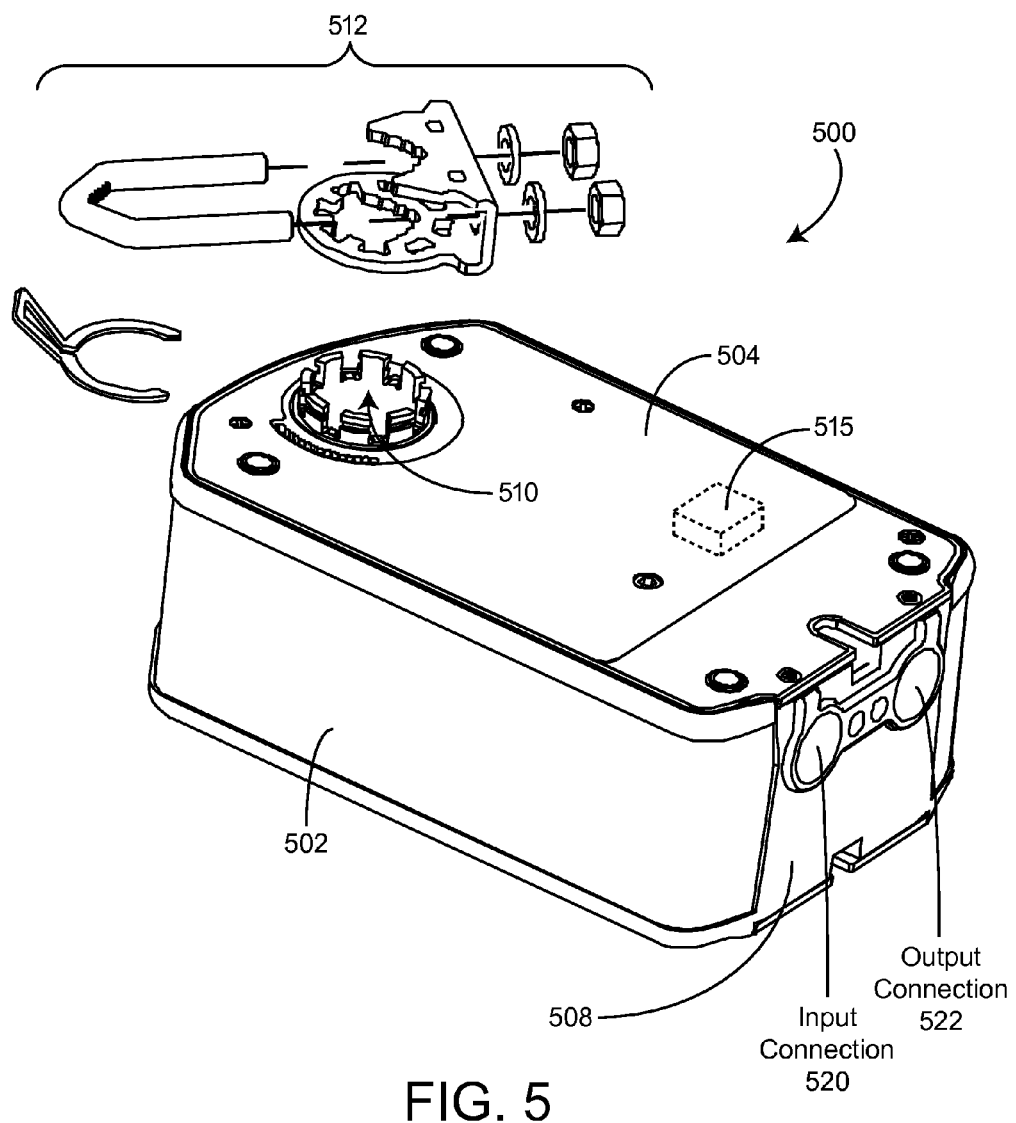

Referring now to FIGS. 5-7, an actuator 500 for use in a HVAC system is shown, according to an exemplary embodiment. In some implementations, actuator 500 may be used in HVAC system 100, waterside system 200, airside system 300, or BMS 400, as described with reference to FIGS. 1-4. For example, actuator 500 may be a damper actuator, a valve actuator, a fan actuator, a pump actuator, or any other type of actuator that can be used in a HVAC system or BMS. In various embodiments, actuator 500 may be a linear actuator (e.g., a linear proportional actuator), a non-linear actuator, a spring return actuator, or a non-spring return actuator.

Actuator 500 is shown to include a housing 502 having a front side 504 (i.e., side A), a rear side 506 (i.e., side B) opposite front side 504, and a bottom 508. Housing 502 may contain the mechanical and processing components of actuator 500. In some embodiments, housing 502 contains a brushless direct current (BLDC) motor and a processing circuit configured to provide a pulse width modulated (PWM) DC output to control the speed of the BLDC motor. The processing circuit may be configured to compare a representation of the electric current output to the BLDC motor to a threshold and may hold the PWM DC output in an off state when the current exceeds the threshold. The processing circuit may also be configured to set the PWM DC output to zero and then ramp up the PWM DC output when actuator 500 approaches an end stop. The internal components of actuator 500 are described in greater detail with reference to FIGS. 8-14.

Actuator 500 is shown to include a drive device 510. Drive device 510 may be a drive mechanism, a hub, or other device configured to drive or effectuate movement of a HVAC system component. For example, drive device 510 may be configured to receive a shaft of a damper, a valve, or any other movable HVAC system component in order to drive (e.g., rotate) the shaft. In some embodiments, actuator 500 includes a coupling device 512 configured to aid in coupling drive device 510 to the movable HVAC system component. For example, coupling device 512 may facilitate attaching drive device 510 to a valve or damper shaft.

Actuator 500 is shown to include an input connection 520 and an output connection 522. In some embodiments, input connection 520 and output connection 522 are located along bottom 508. In other embodiments, input connection 520 and output connection 522 may be located along one or more other surfaces of housing 502. Input connection 520 may be configured to receive a control signal (e.g., a voltage input signal) from an external system or device. Actuator 500 may use the control signal to determine an appropriate PWM DC output for the BLDC motor. In some embodiments, the control signal is received from a controller such as an AHU controller (e.g., AHU controller 330), an economizer controller, a supervisory controller (e.g., BMS controller 366), a zone controller, a field controller, an enterprise level controller, a motor controller, an equipment-level controller (e.g., an actuator controller) or any other type of controller that can be used in a HVAC system or BMS.

In some embodiments, the control signal is a DC voltage signal. Actuator 500 may be a linear proportional actuator configured to control the position of drive device 510 according to the value of the DC voltage received at input connection 520. For example, a minimum input voltage (e.g., 0.0 VDC) may correspond to a minimum rotational position of drive device 510 (e.g., 0 degrees, −5 degrees, etc.), whereas a maximum input voltage (e.g., 10.0 VDC) may correspond to a maximum rotational position of drive device 510 (e.g., 90 degrees, 95 degrees, etc.). Input voltages between the minimum and maximum input voltages may cause actuator 500 to move drive device 510 into an intermediate position between the minimum rotational position and the maximum rotational position. In other embodiments, actuator 500 may be a non-linear actuator or may use different input voltage ranges or a different type of input signal (e.g., AC voltage or current) to control the position and/or rotational speed of drive device 510.

In some embodiments, the control signal is an AC voltage signal. Input connection 520 may be configured to receive an AC voltage signal having a standard power line voltage (e.g., 120 VAC or 230 VAC at 50/60 Hz). The frequency of the voltage signal may be modulated (e.g., by a controller for actuator 500) to adjust the rotational position and/or speed of drive device 510. In some embodiments, actuator 500 uses the voltage signal to power various components of actuator 500. Actuator 500 may use the AC voltage signal received via input connection 520 as a control signal, a source of electric power, or both. In some embodiments, the voltage signal is received at input connection 520 from a power supply line that provides actuator 500 with an AC voltage having a constant or substantially constant frequency (e.g., 120 VAC or 230 VAC at 50 Hz or 60 Hz). Input connection 520 may include one or more data connections (separate from the power supply line) through which actuator 500 receives control signals from a controller or another actuator (e.g., 0-10 VDC control signals).

In some embodiments, the control signal is received at input connection 520 from another actuator. For example, if multiple actuators are interconnected in a tandem arrangement, input connection 520 may be connected (e.g., via a communications bus) to the output data connection of another actuator. One of the actuators may be arranged as a master actuator with its input connection 520 connected to a controller, whereas the other actuators may be arranged as slave actuators with their respective input connections connected to the output connection 522 of the master actuator.

Output connection 522 may be configured to provide a feedback signal to a controller of the HVAC system or BMS in which actuator 500 is implemented (e.g., an AHU controller, an economizer controller, a supervisory controller, a zone controller, a field controller, an enterprise level controller, etc.). The feedback signal may indicate the rotational position and/or speed of actuator 500. In some embodiments, output connection 522 may be configured to provide a control signal to another actuator (e.g., a slave actuator) arranged in tandem with actuator 500. Input connection 520 and output connection 522 may be connected to the controller or the other actuator via a communications bus. The communications bus may be a wired or wireless communications link and may use any of a variety of disparate communications protocols (e.g., BACnet, LON, WiFi, Bluetooth, NFC, TCP/IP, etc.).

Still referring to FIGS. 5-7, actuator 500 is shown to include a first user-operable switch 514 located along front side 504 (shown in FIG. 6) and a second user-operable switch 516 located along rear side 506 (shown in FIG. 7). Switches 514-516 may be potentiometers or any other type of switch (e.g., push button switches such as switch 515, dials, flippable switches, etc.). Switches 514-516 may be used to set actuator 500 to a particular operating mode or to configure actuator 500 to accept a particular type of input. However, it should be understood that switches 514-516 are optional components and are not required for actuator 500 to perform the processes described herein. As such, one or more of switches 514-516 may be omitted without departing from the teachings of the present invention.

Referring particularly to FIG. 6, switch 514 may be a mode selection switch having a distinct number of modes or positions. Switch 514 may be provided for embodiments in which actuator 500 is a linear proportional actuator that controls the position of drive device 510 as a function of a DC input voltage received at input connection 520. In some embodiments, the function of mode selection switch 514 is the same or similar to the function of the mode selection switch described in U.S. patent application Ser. No. 14/727,284, filed Jun. 1, 2015, the entire disclosure of which is incorporated by reference herein. For example, the position of mode selection switch 514 may be adjusted to set actuator 500 to operate in a direct acting mode, a reverse acting mode, or a calibration mode.

Mode selection switch 514 is shown to include a 0-10 direct acting (DA) mode, a 2-10 DA mode, a calibration (CAL) mode, a 2-10 reverse acting (RA) mode, and a 0-10 RA mode. According to other exemplary embodiments, mode selection switch 514 may have a greater or smaller number of modes and/or may have modes other than listed as above. The position of mode selection switch 514 may define the range of DC input voltages that correspond to the rotational range of drive device 510. For example, when mode selection switch 514 is set to 0-10 DA, an input voltage of 0.0 VDC may correspond to 0 degrees of rotation position for drive device 510. For this same mode, an input voltage of 1.7 VDC may correspond to 15 degrees of rotation position, 3.3 VDC may correspond to 30 degrees of rotation position, 5.0 VDC may correspond to 45 degrees of rotation position, 6.7 VDC may correspond to 60 degrees of rotation position, 8.3 VDC may correspond to 75 degrees of rotation position, and 10.0 VDC may correspond to 90 degrees of rotation position. It should be understood that these voltages and corresponding rotational positions are merely exemplary and may be different in various implementations.

Referring particularly to FIG. 7, switch 516 may be a mode selection switch having a distinct number or modes or positions. Switch 516 may be provided for embodiments in which actuator 500 is configured to accept an AC voltage at input connection 520. In some embodiments, the function of mode selection switch 516 is the same or similar to the function of the mode selection switch described in U.S. patent application Ser. No. 14/475,141, filed Sep. 1, 2014, the entire disclosure of which is incorporated by reference herein. For example, the position of switch 516 may be adjusted to set actuator 500 to accept various different AC voltages at input connection 520.

Mode selection switch 516 is shown to include a "24 VAC" position, a "120 VAC" position, a "230 VAC" position, an "Auto" position. Each position of switch 516 may correspond to a different operating mode. According to other exemplary embodiments, switch 516 may have a greater or lesser number of positions and/or may have modes other than the modes explicitly listed. The different operating modes indicated by switch 516 may correspond to different voltage reduction factors applied to the input voltage received at input connection 520. For example, with switch 516 in the 24 VAC position, actuator 500 may be configured to accept an input voltage of approximately 24 VAC (e.g., 20-30 VAC) at input connection 520 and may apply a reduction factor of approximately 1 to the input voltage. With switch 516 in the 120 VAC position, actuator 500 may be configured to accept an input voltage of approximately 120 VAC (e.g., 100-140 VAC, 110-130 VAC, etc.) at input connection 520 and may apply a reduction factor of approximately 5 (e.g., 3-7, 4-6, 4.5-5.5, etc.) to the input voltage. With switch 516 in the 230 VAC position, actuator 500 may be configured to accept an input voltage of approximately 230 VAC (e.g., 200-260 VAC, 220-240 VAC, etc.) at input connection 520 and may apply a reduction factor of approximately 9.6 (e.g., 7-13, 8-12, 9-10, etc.) to the input voltage. With switch 516 in the "Auto" position, actuator 500 may be configured automatically determine the input voltage received at input connection 520 and may adjust the voltage reduction factor accordingly.

Speed and Torque Control System

Figure 8:
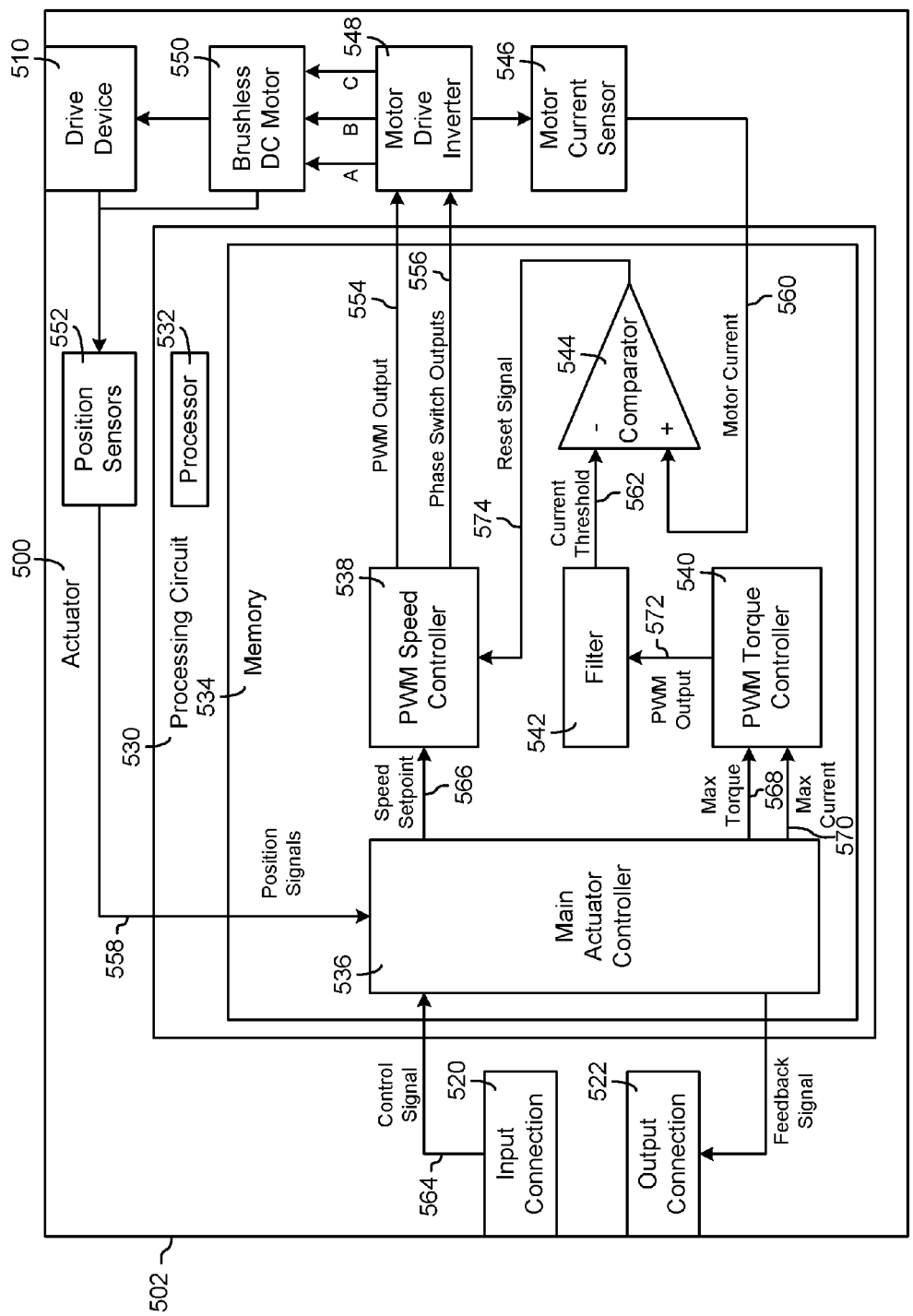
FIG. 8 is a block diagram illustrating the actuator of FIGS. 5-7 in greater detail, according to an exemplary embodiment.

Referring now to FIG. 8, a block diagram illustrating actuator 500 in greater detail is shown, according to an exemplary embodiment. Actuator 500 is shown to include input connection 520, output connection 522, and drive device 510 contained within housing 502. Actuator 500 is shown to further include a brushless DC (BLDC) motor 550 connected to drive device 510, a motor drive inverter 548 (e.g., an H-bridge) configured to provide a three-phase pulse width modulated (PWM) voltage output to BLDC motor 550, a motor current sensor 546 (e.g., a current sense resistor) configured to sense the electric current provided to BLDC motor 550, and position sensors 552 configured to measure the rotational position of BLDC motor 550 and/or drive device 510.

BLDC motor 550 may be connected to drive device 510 and may be configured to rotate drive device 510 through a range of rotational positions. For example, a shaft of BLDC motor 550 may be coupled to drive device 510 (e.g., via a drive train or gearing arrangement) such that rotation of the motor shaft causes a corresponding rotation of drive device 510. In some embodiments, the drive train functions as a transmission. The drive train may translate a relatively high speed, low torque output from BLDC motor 550 into a relatively low speed, high torque output suitable for driving a HVAC component connected to drive device 510 (e.g., a damper, a fluid valve, etc.). For example, the drive train may provide a speed reduction of approximately 1000:1, 2500:1, 5000:1, or any other speed reduction as may be suitable for various implementations.

BLDC motor 550 may be configured to receive a three-phase PWM voltage output (e.g., phase A, phase B, phase C) from motor drive inverter 548. The duty cycle of the PWM voltage output may define the rotational speed of BLDC motor 550 and may be determined by processing circuit 530 (e.g., a microcontroller). Processing circuit 530 may increase the duty cycle of the PWM voltage output to increase the speed of BLDC motor 550 and may decrease the duty cycle of the PWM voltage output to decrease the speed of BLDC motor 550. Processing circuit 530 is shown providing a PWM voltage output 554 and phase switch outputs 556 to motor drive inverter 548. Motor drive inverter 548 may use phase switch outputs 556 to apply PWM output 554 to a particular winding of BLDC motor 550. The operation of motor drive inverter 548 is described in greater detail with reference to FIG. 9.

Position sensors 552 may include Hall effect sensors, potentiometers, optical sensors, or other types of sensors configured to measure the rotational position of BLDC motor 550 and/or drive device 510. Position sensors 552 may provide position signals 558 to processing circuit 530. Processing circuit 530 uses position signals 558 to determine whether to operate BLDC motor 550. For example, processing circuit 530 may compare the current position of drive device 510 with a position setpoint received via input connection 520 and may operate BLDC motor 550 to achieve the position setpoint.

Motor current sensor 546 may be configured to measure the electric current provided to BLDC motor 550. Motor current sensor 546 may generate a feedback signal indicating the motor current 560 and may provide feedback signal to processing circuit 530. Processing circuit 530 may be configured to compare the motor current 560 to a threshold 562 (e.g., using comparator 544) and may hold PWM output 554 in an off state when motor current 560 exceeds threshold 562. Processing circuit 530 may also be configured to set PWM output 554 to zero and then ramp up PWM output 554 when the position of drive device 510 approaches an end stop. These and other features of actuator 500 are described in greater detail below.

Still referring to FIG. 8, processing circuit 530 is shown to include a processor 532 and memory 534. Processor 532 may be a general purpose or specific purpose processor, an application specific integrated circuit (ASIC), one or more field programmable gate arrays (FPGAs), a group of processing components, or other suitable processing components. Processor 532 may be configured to execute computer code or instructions stored in memory 534 or received from other computer readable media (e.g., CDROM, network storage, a remote server, etc.).

Memory 534 may include one or more devices (e.g., memory units, memory devices, storage devices, etc.) for storing data and/or computer code for completing and/or facilitating the various processes described in the present disclosure. Memory 534 may include random access memory (RAM), read-only memory (ROM), hard drive storage, temporary storage, non-volatile memory, flash memory, optical memory, or any other suitable memory for storing software objects and/or computer instructions. Memory 534 may include database components, object code components, script components, or any other type of information structure for supporting the various activities and information structures described in the present disclosure. Memory 534 may be communicably connected to processor 532 via processing circuit 530 and may include computer code for executing (e.g., by processor 532) one or more processes described herein. When processor 532 executes instructions stored in memory 534, processor 532 generally configures actuator 500 (and more particularly processing circuit 530) to complete such activities.

Processing circuit 530 is shown to include a main actuator controller 536. Main actuator controller 536 may be configured to receive control signals 564 from input connection 520 (e.g., position setpoints, speed setpoints, etc.) and position signals 558 from position sensors 552. Main actuator controller 536 may be configured to determine the position of BLDC motor 550 and/or drive device 510 based on position signals 558. In some embodiments, main actuator controller 536 calculates the speed of BLDC motor 550 and/or drive device 510 using a difference in the measured positions over time. For example, the speed of BLDC motor 550 may be determined by main actuator controller 536 using a measured time between Hall sensor interrupt signals provided by Hall sensors integral to BLDC motor 550.

Main actuator controller 536 may determine an appropriate speed setpoint 566 for BLDC motor 550 (e.g., in percentage terms, in terms of absolute position or speed, etc.). In some embodiments, main actuator controller 536 provides speed setpoint 566 to PWM speed controller 538. In other embodiments, main actuator controller 536 calculates an appropriate PWM duty cycle to achieve a desired speed and provides the PWM duty cycle to PWM speed controller 538. In some embodiments, main actuator controller 536 calculates speed setpoint 566 based on the position of drive device 510. For example, main actuator controller 536 may be configured to set speed setpoint 566 to zero when the position of drive device is within a predetermined distance from an end stop. Main actuator controller 536 may then cause speed setpoint 566 to ramp up until the end stop is reached. These and other features of main actuator controller 536 are described in greater detail with reference to FIG. 13.

Still referring to FIG. 8, processing circuit 530 is shown to include a PWM speed controller 538. PWM speed controller 538 may receive a speed setpoint 566 and/or a PWM duty cycle from main actuator controller 536. PWM speed controller 538 may generate PWM output 554 (e.g., a PWM DC voltage output) and provide PWM output 554 to motor drive inverter 548. The duty cycle of PWM output 554 may determine the speed of rotation for BLDC motor 550. The width of the output PWM pulses can be adjusted by PWM speed controller 538 to achieve varying commanded motor speeds and/or to obtain varying motor or actuator positions.

In some embodiments, PWM speed controller 538 provides phase switch outputs 556 to motor drive inverter 548.

Figure 9:
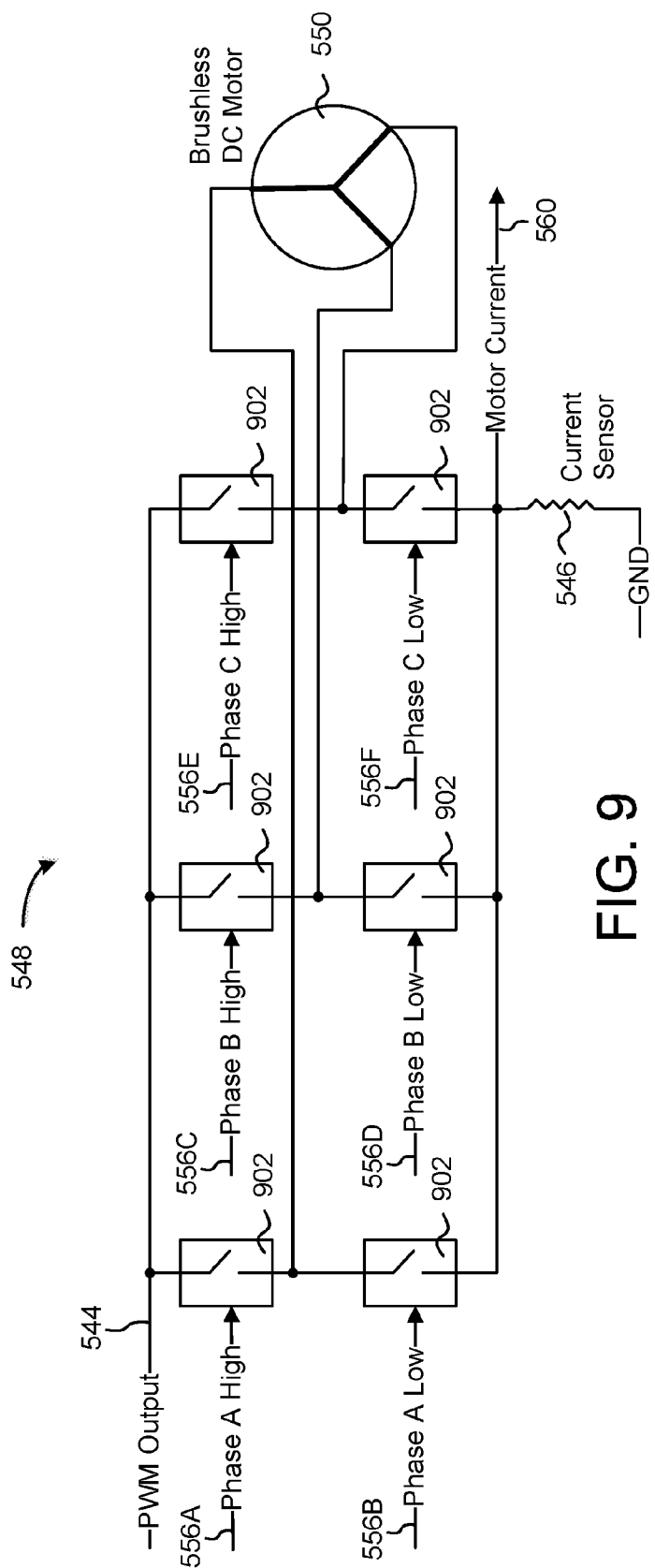
FIG. 9 is a circuit diagram illustrating a motor drive inverter circuit which may be used in the actuator of FIGS. 5-7, according to an exemplary embodiment.

Phase switch outputs 556 may be used by motor driver inverter 548 to control the polarity of the PWM output 554 provided to the windings of BLDC motor 550. In some embodiments, motor drive inverter 548 is an H-bridge. An exemplary embodiment of such an H-bridge is shown in FIG. 9. While an H-bridge is shown in drawings, other switching circuits or controls may be used to controllably vary the phase switching in synchronization with the desired speed or rotation of BLDC motor 550.

Still referring to FIG. 8, motor current sensor 546 may be coupled to motor drive inverter 548 in a manner that allows current sensor 546 to provide an output (e.g., a voltage output) that indicates the amount of the electric current 560 provided to BLDC motor 550 on any phase line. A reading representative of sensed current 560 may be provided from motor current sensor 546 to comparator 544. Comparator 544 may be a discrete electronics part or implemented as part of main actuator controller 536 or another controller that forms a part of processing circuit 530. Comparator 544 may be configured to compare motor current 560 to an electric current threshold 562.

If the motor current 560 from current sensor 546 exceeds the threshold 562, comparator 544 may output a reset signal 574 to PWM speed controller 538. The application of reset signal 574 may cause PWM speed controller 538 to turn off PWM output 554 (e.g., by changing PWM output 554 to a duty cycle of 0%, setting PWM output 554 to zero, etc.) for a period of time or until comparator 544 indicates that motor current 560 no longer exceeds threshold 562. In other words, if the current threshold 562 for BLDC motor 550 is exceeded, comparator 544 may begin to interfere with PWM output 554 (e.g., by holding PWM output 554 in an off state), thereby causing BLDC motor 550 to slow down. Since the torque provided by BLDC motor 550 is proportional to motor current 560, both the electric current and torque of BLDC motor 550 can be limited by the application of reset signal 574.

The current threshold 562 may be controlled by main actuator controller 536. For example, threshold 562 may start as a digital value stored within main actuator controller 536 (e.g., a maximum torque threshold 568 or a maximum current threshold 570). Main actuator controller 536 may control threshold 562 by adjusting the thresholds 568 and/or 570 provided to PWM torque controller 540. Main actuator controller 536 may increase threshold 562 by increasing the maximum torque threshold 568 and/or the maximum current threshold 570. Main actuator controller 526 may decrease threshold 562 by decreasing the maximum torque threshold 568 and/or the maximum current threshold 570.

PWM torque controller 540 may be configured to generate a PWM output 572 based on the maximum torque 568 and/or maximum current 570 provided by main actuator controller 536. PWM torque controller 540 may convert the thresholds 568 and/or 570 to a PWM output 572 and provide the PWM output 572 to filter 542. Filter 542 may be configured to convert the PWM output 572 from PWM torque controller 540 into a current threshold 562 (e.g., a DC voltage representative of an electric current) for comparison to the output of current sensor 546 using a filter 542. In some embodiments, filter 542 is a first order low pass filter having a resistor in series with the load and a capacitor in parallel with the load. In other embodiments, filter 542 may be a low pass filter of a different order or a different type of filter.

In some embodiments, the threshold 562 provided to comparator 544 is based on a temperature sensor input. As the temperature sensor input varies (e.g., based on the changing ambient temperature, based on a temperature of a motor element, etc.), main actuator controller 536 may cause the threshold 562 to be adjusted. For example, as the temperature sensor input changes, main actuator controller 536 may adjust the thresholds 568 and/or 570 provided to PWM torque controller 540. Adjusting the thresholds 568 and/or 570 provided to PWM torque controller 540 may cause the duty cycle of PWM output 572 to change, which causes a corresponding change in the current threshold 562 output by filter 542.

In various embodiments, threshold 562 may be adjusted automatically by main actuator controller 536, adjusted by a user, or may be a static value. In some embodiments, threshold 562 is a static or dynamic value based on one or more variables other than ambient temperature. For example, threshold 562 may be set to a value that corresponds to the maximum current that can safely be provided to BLDC motor 550 or a maximum torque that can safely be provided by BLDC motor 550 to drive device 510.

Referring now to FIG. 9, motor drive inverter 548, BLDC motor 550, and current sensor 546 are shown in greater detail, according to an exemplary embodiment. Motor drive inverter 548 is shown to receiving PWM output 554 and phase switch outputs 556 for each of three phase lines of BLDC motor 550. Phase switch outputs 556 are shown to include a "Phase A High" output 556A, a "Phase A Low" output 556B, a "Phase B High" output 556C, a "Phase B Low" output 556D, a "Phase C High" output 556E, and a "Phase C Low" output 556F. Phase switch outputs 556 may be provided to switching elements 902. Switching elements 902 may be transistors configured to allow or deny current to flow through switching elements 902 from PWM output 554. Current sensor 546 is shown as a current sense resistor and may be configured to sense the motor current 560 provided to BLDC motor 550 regardless of the active winding.

Figure 10:
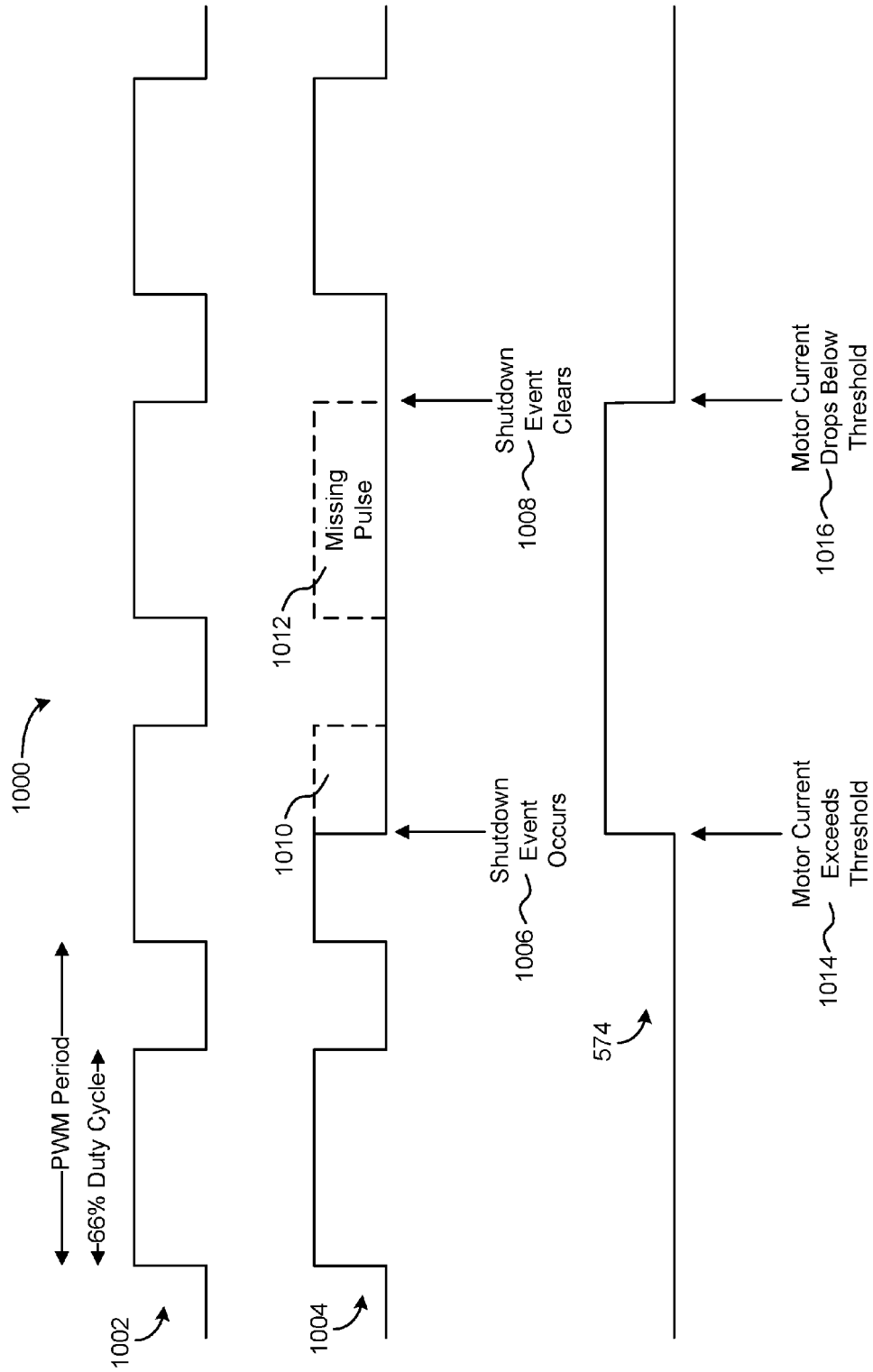
FIG. 10 is an illustration of a pulse width modulation (PWM) shutdown technique which may be used by the actuator of FIGS. 5-7 to limit the electric current through a motor of the actuator when the electric current exceeds a threshold, according to an exemplary embodiment.

Referring now to FIG. 10, an illustration 1000 of the speed and torque control technique used by processing circuit 530 is shown, according to an exemplary embodiment. Illustration 1000 includes a normal PWM output 1002 and an affected PWM output 1004. Normal PWM output may be provided as PWM output 554 by PWM speed controller 538 in the absence of a reset signal 574. Normal PWM output 1002 has a steady 66% duty cycle, which causes BLDC motor 550 to run at a particular speed. PWM output 1004 may be provided as PWM output 554 when a current overrun event is experienced. PWM output 1004 is an example of the PWM output 554 provided by PWM speed controller 538 in the presence of reset signal 574.

As shown in FIG. 10, the motor current 560 exceeds the threshold 562 at time 1014, which causes the reset signal 574 to change to a high value. When the reset signal 574 is high, PWM speed controller 538 may cause a shutdown event 1006 to occur. Shutdown event 1006 may include holding PWM output 1004 in an off state for the duration of the shutdown event. For example, PWM output 1004 is shown to include part of a first pulse 1010 and an entire missing pulse 1012 which are "off" rather than "on" due to the shutdown event 1006. This causes BLDC motor 550 to slow down, reduces motor current 560, and advantageously avoids prolonged or series overcurrent. When motor current 560 drops below the threshold 562 at time 1016, the shutdown event clears 1008 and PWM output 1004 continues as usual.

Speed and Torque Control Processes

Figure 11:
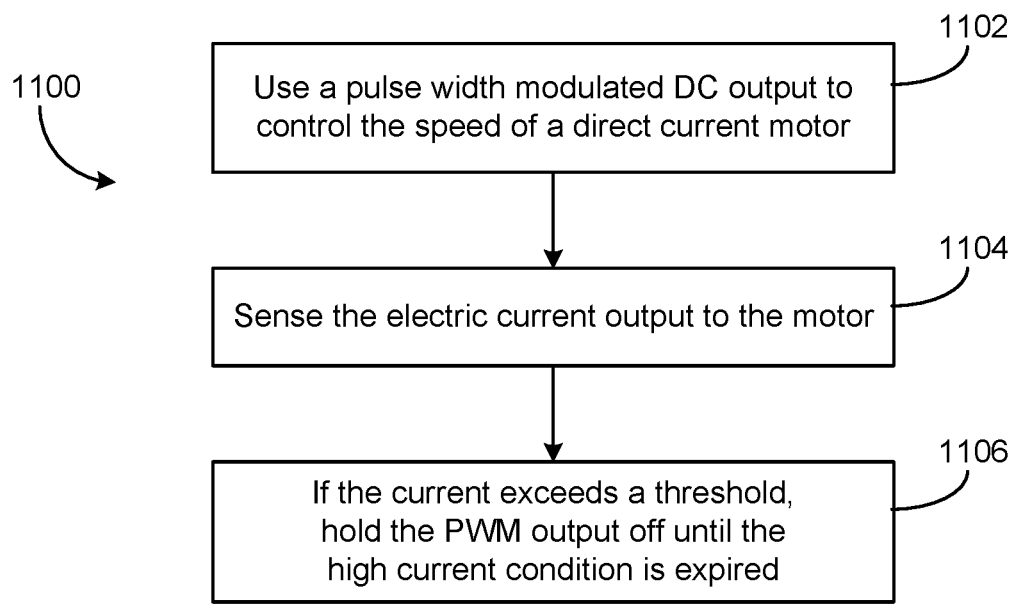
FIG. 11 is a flowchart of a torque control process which may be performed by the actuator of FIGS. 5-7 for controlling a direct current motor using PWM, according to an exemplary embodiment.

Referring now to FIG. 11, a flowchart of a process 1100 for operating a BLDC motor is shown, according to an exemplary embodiment. Process 1100 may be performed by processing circuit 530 of actuator 500 to operate BLDC motor 550. As shown in FIG. 8, BLDC motor 550 may be implemented within actuator 500. A microcontroller such as processing circuit 530 may particularly be configured to cause the steps of process 1100 to be executed. However, it should be appreciated that solid state electronic circuitry may be provided to perform the steps of process 1100 in place of a microcontroller.

Process 1100 is shown to include using a pulse width modulated DC output to control the speed of a direct current motor (step 1102). The direct current motor may be a BLDC motor such as BLDC motor 550. In some embodiments, step 1102 includes determining a speed or position setpoint for the BLDC motor and/or a drive device driven by the BLDC motor (e.g., drive device 510). In various embodiments, logic for determining the speed or position setpoint of the BLDC motor and/or the drive device may be embedded within processing circuit 530 or may be external to the actuator itself. In such instances, a setpoint may be provided to the actuator via an input connection (e.g., input connection 520). Processing circuit 530 can use pulse width modulation control to provide an appropriate PWM DC output for achieving the requested speed of the DC motor, as described with reference to FIG. 8.

Process 1100 is shown to include sensing the current output to the motor (step 1104). Sensing the current output to the motor may include using a current sensor (e.g., motor current sensor 546) to measure a voltage representative of the current output. The current output may be provided to the processing circuit.

Process 1100 is shown to include holding the PWM output in an off state if the sensed current exceeds a threshold (step 1106). Holding the PWM output in an off state may include refraining from sending any pulses to the DC motor. The PWM output may be resumed when the high current condition is expired. Expiration of the high current condition may be sensed (e.g., when the sensed current falls below the threshold) or may be estimated based on an elapsed time period.

Figure 12:
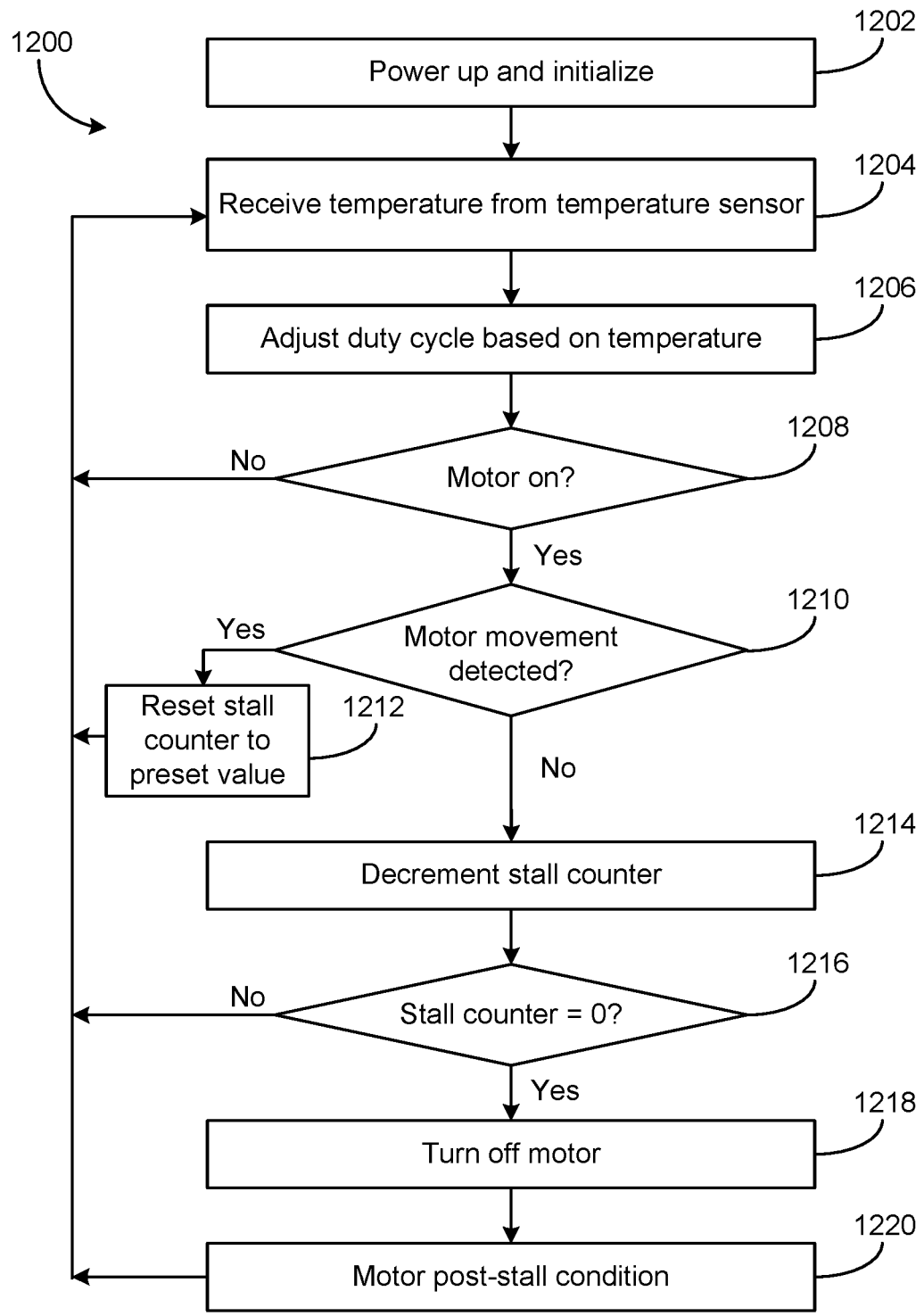
FIG. 12 is flowchart of another torque control process which may be performed by the actuator of FIGS. 5-7 for controlling a direct current motor using PWM, according to an exemplary embodiment.

Referring now to FIG. 12, another process 1200 for operating a DC motor is shown, according to an exemplary embodiment. Process 1200 may be performed by processing circuit 530 of actuator 500 to operate BLDC motor 550. Process 1200 is shown to include powering up and initializing (step 1202) and receiving a temperature reading from a temperature sensor (step 1204). Step 1202 may include recalling an initial duty cycle and recalling an initial stall counter state. In some embodiments, the initial stall counter state is a non-zero number. As described with reference to FIG. 8, the duty cycle of the PWM output 572 provided by PWM torque controller 540 may be adjusted based on the temperature (step 1206).

Process 1200 is shown to include determining if the motor is on (step 1208). If the motor is on, process 1200 may include checking if motor movement is detected (step 1210). Motor movement may be checked using one or more Hall sensors. If the motor is moving, the stall counter (e.g., the counter used to represent a stalled motor condition) may be reset to a default value and process 1200 may be reset to a predetermined value (step 1212). If the motor is currently stalled, the stall counter may be decremented (step 1214) but not stopped (e.g., allowing for a temporary stall).

Process 1200 is shown to include determining whether the stall counter reaches zero (step 1216). When the stall counter reaches zero, the motor may be turned off (step 1218) and the motor enters a post-stalling condition (step 1220). The post stall condition may include resuming operation once the stall condition is cleared (e.g., movement is detected). In an exemplary embodiment, process 1200 can run in parallel to the processes for operation described herein that rely on holding PWM in an off state during an over current condition (overcurrent can be caused by stalls). In other embodiments, process 1200 may be run as one alternative to the process described with reference to FIGS. 8-11.

Soft Stall Control System

Figure 13:
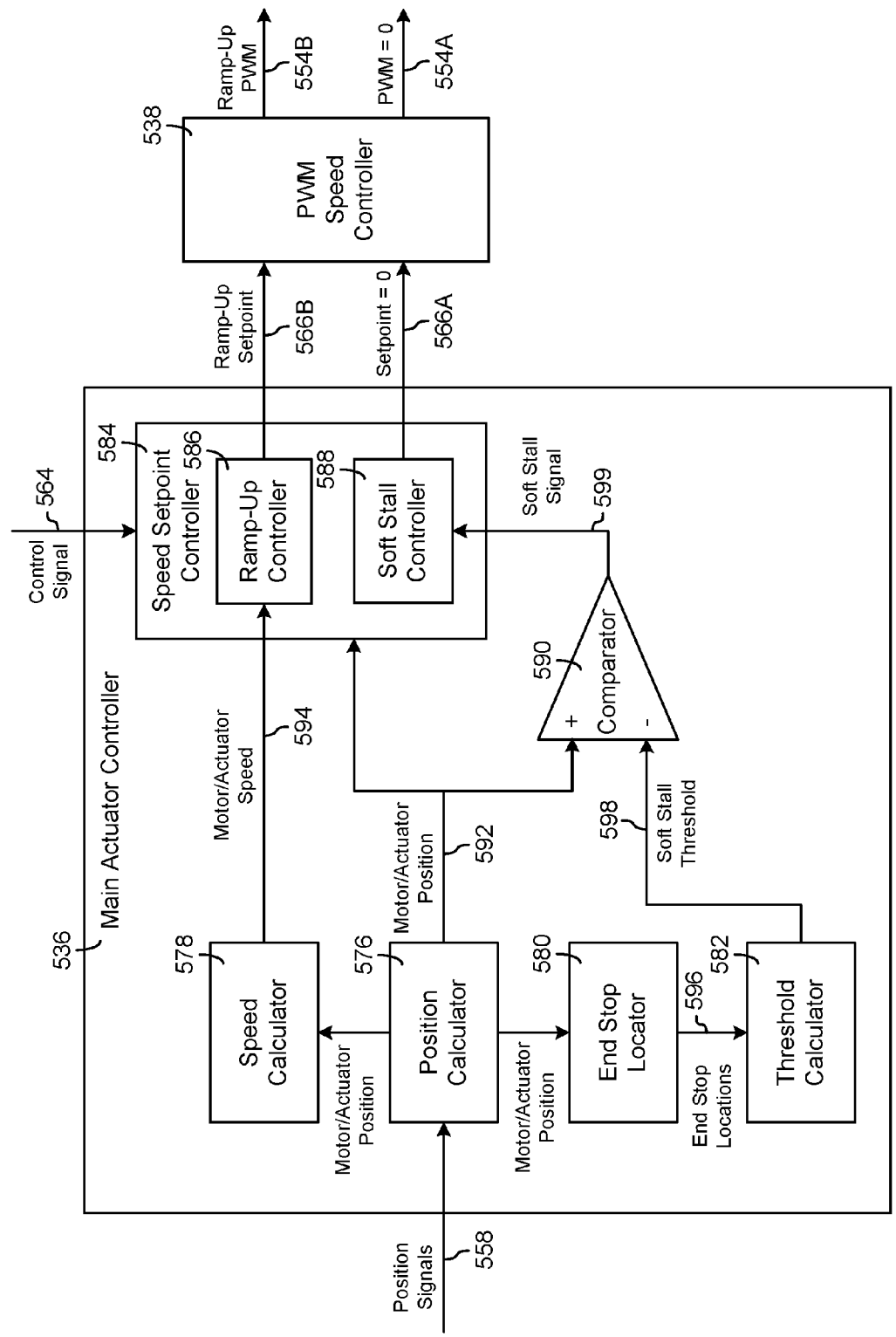
FIG. 13 is a block diagram illustrating a main actuator controller of the actuator of FIGS. 5-7 in greater detail, according to an exemplary embodiment.

Referring now to FIG. 13, a block diagram illustrating main actuator controller 536 in greater detail is shown, according to an exemplary embodiment. As previously described, main actuator controller 536 may be configured to determine an appropriate speed setpoint 566 for BLDC motor 550 and may provide speed setpoint 566 to PWM speed controller 538. PWM speed controller 538 may generate a PWM output 554 having a duty cycle based on speed setpoint 566 and may provide PWM output 554 to BLDC motor 550 (e.g., via motor drive inverter 548). The duty cycle of PWM output 554 causes BLDC motor 550 to achieve speed setpoint 566.

FIG. 13 illustrates an exemplary soft stall technique which may be used by main actuator controller 536 to control speed setpoint 566 (and the PWM output 554 resulting from speed setpoint 566) when actuator 500 approaches an end stop. In brief overview, main actuator controller 536 may use position signals 558 to determine the current rotational position of drive device 510. When drive device 510 is within a predetermined distance from a known end stop location, main actuator controller 536 sets speed setpoint 566 to zero (i.e., setpoint 566A), which causes PWM speed controller 538 to set PWM output 554 to zero (i.e., PWM output 554A) and ultimately stops motor commutation. Main actuator controller 536 then ramps-up speed setpoint 566 (i.e., ramp-up setpoint 566B), which causes PWM speed controller 538 to ramp-up PWM output 554 (i.e., ramp-up PWM 554B) and increases the speed of BLDC motor 550 as drive device 510 approaches the end stop.

Unlike conventional techniques which merely slow down the speed of the motor as the actuator approaches an end stop, the soft stall technique performed by main actuator controller 536 completely stops motor commutation. Once BLDC motor 550 has completely stopped, main actuator controller 536 causes a ramp-up of the PWM output 554, which increases the speed of BLDC motor 550 until the mechanical end of travel is reached. As such, main actuator controller 536 does not slow down the speed of BLDC motor 550 while approaching an end stop, but rather completely stops BLDC motor 550 and then increases the speed of BLDC motor 550 until the end stop is reached. Advantageously, the soft stall technique may reduce the impulse force seen at the mechanical end stop, thereby increasing the longevity of the mechanical gear train without the need to change the physical gearbox design.

Still referring to FIG. 13, main actuator controller 536 is shown to include a position calculator 576. Position calculator 576 may receive position signals 558 from position sensors 552. Position calculator 576 may be configured to determine the position of BLDC motor 550 and/or drive device 510 based on position signals 558. In some embodiments, position signals 558 are interrupt signals from a set of Hall sensors. The Hall sensors may output signals that represent motor revolutions. Position calculator 576 may be configured to count the number of interrupt signals from the Hall sensors and may determine the number of motor revolutions that have occurred based on the number of signals from the Hall sensors.

In some embodiments, position calculator 576 determines the direction of rotation of BLDC motor 550 based on an order in which the interrupt signals are received from the Hall sensors. For example, position sensors 552 may include a plurality of Hall sensors that provide interrupt signals to position calculator 576 based on the position of BLDC motor 550. The interrupt signals may be converted into a combined Hall sensor value that indicates which of the Hall sensors are currently providing an interrupt signal. In some embodiments, the Hall sensor value is a numerical or other data value within a predetermined range (e.g., 1-6, A-F, etc.). Position calculator 576 may determine the direction of rotation of BLDC motor 550 by identifying an order or sequence of the Hall sensor values. For example, if the Hall sensor values are received in a first order (e.g., 4-5-1-3-2-6), position calculator 576 may determine that BLDC motor 550 has a first direction of rotation (e.g., clockwise). However, if the Hall sensor values are received in a second order (e.g., 6-2-3-1-5-4), position calculator 576 may determine that BLDC motor 550 has a second direction of rotation (e.g., counterclockwise), opposite the first direction of rotation.

In some embodiments, position calculator 576 defines the rotational position of drive device 510 in terms of Hall sensor counts. In other embodiments, position calculator 576 defines the rotational position of BLDC motor 550 in terms of Hall sensor counts and converts the number of motor revolutions into a rotational position of drive device 510 based on a gearing arrangement (e.g., a gear ratio) between BLDC motor 550 and drive device 510. For example, if the gear ratio between BLDC motor 550 and drive device 510 is 3600:1, position calculator 576 may determine that each revolution of BLDC motor 550 corresponds to a rotation of approximately 0.1 degrees of drive device 510. Position calculator 576 may add or subtract a change in position of drive device 510 from a known initial position of drive device 510 to determine the current position of drive device 510.

In various embodiments, position calculator 576 may output the position of BLDC motor 550 and/or drive device 510 in terms of Hall sensor counts, motor revolutions, motor position, drive device position, or any other unit that can be used to quantify the position of BLDC motor 550 and/or drive device 510. It is contemplated that motor/actuator position 592 may include any of these or other position metrics. For example, position calculator 576 may output a motor/actuator position 592 that indicates the current position of drive device 510 as a number of degrees of rotation of drive device 510 relative to a fixed position (e.g., a zero location, a mechanical end stop, etc.), a number of revolutions of BLDC motor 550, a number of Hall sensor counts, etc.

Still referring to FIG. 13, main actuator controller 536 is shown to include a speed calculator 578. Speed calculator 578 may be configured to calculate the speed of BLDC motor 550 and/or drive device 510 based on the values of motor/actuator position 592 received from position calculator 576. For example, speed calculator 578 may be configured to determine a difference between two or more of the values of motor/actuator position 592. Speed calculator 578 may divide the difference in distance by a time that elapses between the position measurements to calculate the speed of BLDC motor 550 and/or drive device 510.

In various embodiments, speed calculator 578 may output the speed of BLDC motor 550 and/or drive device 510 in terms of a Hall sensor count rate (e.g., Hall counts per second), motor speed (e.g., revolutions per second), drive device speed (e.g., degrees per second), or any other unit that can be used to quantify the speed of BLDC motor 550 and/or drive device 510. It is contemplated that motor/actuator speed 594 may include any of these or other speed metrics. For example, speed calculator 578 may output a motor/actuator speed 594 that indicates the current speed of drive device 510 as a number of degrees per second, a number of revolutions of BLDC motor 550 per second, a number of Hall sensor counts per second, etc.

Still referring to FIG. 13, main actuator controller 536 is shown to include an end stop locator 580. End stop locator 580 may be configured to identify the locations of one or more end stops of actuator 500 and/or end stops of a HVAC component connected to actuator 500. The end stops may define end points on a physical range of movement for drive device 510. In various embodiments, the end stops may be mechanical end stops or software-defined end stops (e.g., user-defined locations stored in memory). If the end stops are software defined end stops, end stop locator 580 may identify the end stop locations by retrieving the end stop locations from memory. However, if the end stops are mechanical end stops, end stop locator 580 may perform an automatic calibration procedure to identify the end stop locations.

End stop locator 580 may be configured to run an automatic calibration sequence to identify the mechanical end stop locations for both counterclockwise and clockwise rotation. For example, end stop locator 580 may cause BLDC motor 550 to be operated in one direction until the mechanical end of travel is reached. In some embodiments, end stop locator 580 uses the motor/actuator speed 594 from speed calculator 578 to determine when the mechanical end of travel is reached. For example, when motor/actuator speed 594 remains steady at zero, end stop locator 580 may determine that BLDC motor 550 has stalled and the mechanical end of travel has been reached. End stop locator 580 may record the value of motor/actuator position 592 at the mechanical end of travel as one of the end stop locations 596. End stop locator 580 may then cause BLDC motor 550 to be operated in the opposite direction until another mechanical end of travel is reached. End stop locator 580 may record the value of motor/actuator position 592 at the other mechanical end of travel as another end stop location 596.

In some embodiments, end stop locator 580 identifies end stop locations 596 in terms of the number of Hall counts (a metric that quantifies motor/actuator position 592) at each end stop location. Hall counts may be added when drive device 510 rotates in a first direction and subtracted when drive device 510 rotates in a second direction, opposite the first direction. End stop locator 580 may define a first end stop location variable $HallCount_1$ as the number of Hall counts at one of the mechanical ends of travel. In some embodiments, $HallCount_1$ is the minimum number of Hall counts and defines a first end stop location. End stop locator 580 may define a second end stop location variable $HallCount_2$ as the number of Hall counts at the other mechanical end of travel. In some embodiments, $HallCount_2$ is the maximum number of Hall counts and defines a second end stop location, with $HallCount_1 < HallCount_2$.

Still referring to FIG. 13, main actuator controller 536 is shown to include a threshold calculator 582. Threshold calculator 582 may be configured to calculate a soft stall threshold 598 based on end stop locations 596. Soft stall threshold 598 may define one or more threshold values for motor/actuator position 592. When motor/actuator position 592 reaches soft stall threshold 598, main actuator controller 536 may initiate the soft stall control technique. In some embodiments, soft stall threshold 598 includes a first soft stall threshold relative to a first end stop location (e.g., a predetermined number of Hall counts from the first end stop location) and a second soft stall threshold relative to a second end stop location (e.g., a predetermined number of Hall counts from the second end stop location). In some embodiments, threshold calculator 582 calculates soft stall threshold 598 by adding or subtracting a predetermined value N from end stop locations 596. The predetermined value N may be a number of Hall counts, a number of motor revolutions, a number of degrees of rotation of drive device 510, or any other unit in which motor/actuator position 592 can be quantified. In some embodiments, the predetermined value N is approximately 99 Hall counts, which may translate into approximately three motor revolutions.

In some embodiments, threshold calculator 582 determines soft stall threshold 598 in terms of a number of Hall counts from end stop locations 596. For example, threshold calculator 582 may determine a first soft stall threshold $thresh_1$ that is N Hall counts greater than the minimum number of Hall counts $HallCount_1$ (i.e., $thresh_1=HallCount_1+N$) and a second soft stall threshold $thresh_2$ that is N Hall counts less than the maximum number of Hall counts $HallCount_2$ (i.e., $thresh_2=HallCount_2-N$). In other embodiments, soft stall threshold 598 may be defined in terms of a number of degrees of rotation of drive device 510 from an end stop location, a number of motor revolutions from an end stop location, or any other metric that allows threshold calculator 582 to define a particular location relative to end stop locations 596. Threshold calculator 582 may provide soft stall threshold 598 to comparator 590.

Still referring to FIG. 13, main actuator controller 536 is shown to include a comparator 590. Comparator 590 may be configured to determine when actuator 500 is approaching an end stop location 596. Comparator 590 may monitor the current value of motor/actuator position 592 relative to one or more of the soft stall thresholds 598 provided by threshold calculator 582. Comparator 590 may determine that actuator 500 is approaching a first end stop location when motor/actuator position 592 reaches the first soft stall threshold $thresh_1$. Motor/actuator position 592 may reach the first soft stall threshold $thresh_1$ when motor/actuator position 592 transitions from being greater than the first soft stall threshold $thresh_1$ (i.e., motor/actuator position 592>$thresh_1$) to being less than or equal to the first soft stall threshold $thresh_1$ (i.e., motor/actuator position 592≤$thresh_1$). In other words, comparator 590 may determine that actuator 500 is approaching the first end stop location when motor/actuator position 592 crosses first soft stall threshold $thresh_1$ and is moving toward the first end stop location.

Similarly, comparator 590 may determine that actuator 500 is approaching a second end stop location when motor/actuator position 592 reaches the second soft stall threshold $thresh_2$. Motor/actuator position 592 may reach the second soft stall threshold $thresh_2$ when motor/actuator position 592 transitions from being less than the second soft stall threshold $thresh_2$ (i.e., motor/actuator position 592<$thresh_2$) to being greater than or equal to the second soft stall threshold $thresh_2$ (i.e., motor/actuator position 592≥$thresh_2$). In other words, comparator 590 may determine that actuator 500 is approaching the second end stop location when motor/actuator position 592 crosses the second soft stall threshold $thresh_2$ and is moving toward the second end stop location. Upon determining that motor/actuator position 592 has reached either of the soft stall thresholds 598, comparator 590 may provide a soft stall signal 599 to speed setpoint controller 584.

Still referring to FIG. 13, main actuator controller 536 is shown to include a speed setpoint controller 584. Speed setpoint controller 584 may be configured to determine an appropriate speed setpoint 566 for BLDC motor 550. The process used by speed setpoint controller 584 to determine speed setpoint 566 may vary depending on whether the soft stall signal 599 is provided by comparator 590. If soft stall signal 599 is not provided by comparator 590, speed setpoint controller 584 may use control signal 564 to achieve a motor/actuator speed and/or position specified in control signal 564. However, if soft stall signal 599 is provided by comparator 590, speed setpoint controller 584 may perform a soft stall process.

In the absence of soft stall signal 599 (i.e., when soft stall signal 599 is not provided by comparator 590), speed setpoint controller 584 may use control signal 564 to determine speed setpoint 566. For example, speed setpoint controller 584 is shown receiving control signal 564 from input connection 520. In some embodiments, control signal 564 includes a command to move drive device 510 into a particular position or to operate drive device 510 and/or BLDC motor 550 at a particular speed. Speed setpoint controller 584 may generate a speed setpoint 566 for PWM speed controller 538 in order to achieve the position and/or speed specified by control signal 564.

Speed setpoint controller 584 may use any of a variety of control methodologies (e.g., open-loop, closed loop, proportional control, proportional-integral control, etc.) to generate speed setpoint 566 based on control signal 564. In some embodiments, speed setpoint controller 584 uses a closed-loop control technique to generate speed setpoint 566. For example, speed setpoint controller 584 may receive the motor/actuator position 592 from position calculator 576 and/or the motor/actuator speed 594 from speed calculator 578. Speed setpoint controller 584 may compare the current motor/actuator position 592 and/or speed 594 with the position and/or speed specified by control signal 564. Speed setpoint controller 584 may adjust speed setpoint 566 in order increase or decrease the current motor/actuator position 592 and/or speed 594 as may be necessary to achieve the position and/or speed specified by control signal 564.

In the presence of the soft stall signal 599 (i.e., when soft stall signal 599 is provided by comparator 590), speed setpoint controller 584 may use a soft stall process to determine speed setpoint 566. For example, speed setpoint controller 584 is shown to include a soft stall controller 588 and a ramp-up controller 586. In response to receiving soft stall signal 599, soft stall controller 588 may set speed setpoint 566 to zero (i.e., setpoint 566A). Setting speed setpoint 566A may cause PWM speed controller 538 to output a corresponding PWM output 554 of zero (i.e., PWM output 554A). Setting PWM output 554A may completely stop motor commutation and may cause BLDC motor 550 to stall (i.e., stop rotating) prior to reaching the end stop. The motor/actuator speed 594 may be monitored during the soft stall process and provided to ramp-up controller 586.

Ramp-up controller 586 may be configured to generate a ramp-up setpoint 566B and provide the ramp-up setpoint 566B to PWM speed controller 538. Ramp-up setpoint 566B may increase (e.g., linearly, nonlinearly, in a step-up manner, etc.) as a function of motor/actuator position 592 or as a function of time. In some embodiments, ramp-up controller 586 provides ramp-up setpoint 566B to PWM speed controller 538 in response to a determination that BLDC motor 550 has stopped as a result of setting zero speed setpoint 566A. In other embodiments, ramp-up controller 586 provides ramp-up setpoint 566B to PWM speed controller 538 once a predetermined amount of time has elapsed after providing zero speed setpoint 566A and/or after receiving soft stall signal 599. Setting speed setpoint 566B may cause PWM speed controller 538 to ramp-up PWM output 554. For example, PWM speed controller 538 may output a ramp-up PWM output 554B. Ramp-up output PWM 554B may have a duty cycle that increases as a function of motor/actuator position 592 or as a function of time, according to ramp-up setpoint 566B. Providing ramp-up PWM output 554B may cause the speed of BLDC motor 550 to increase as actuator 500 approaches the end stop.

It should be noted that although the various components of main actuator controller 536 (i.e., components 578-590) are shown separately in FIG. 13, it is contemplated that two or more of components 578-590 may be combined into a single integrated component or their functions may be performed by a single component. For example, the functions of position calculator 576, comparator 590, and speed setpoint controller 584 may be performed by a single component that determines the motor/actuator position, compares the position to soft stall threshold 598, and adjusts the speed setpoint 566 based on a result of the comparison. In such an implementation, communications between the combined components may not be required. For example, soft stall signal 599 may be eliminated as it may be unnecessary to communicate a result of the comparison between components. Soft stall controller 588 may determine whether to set speed setpoint 566 to zero based on a result of an internal comparison (i.e., a comparison performed by the single integrated component) rather than relying on a soft stall signal 599 received from another component.

Figure 14:
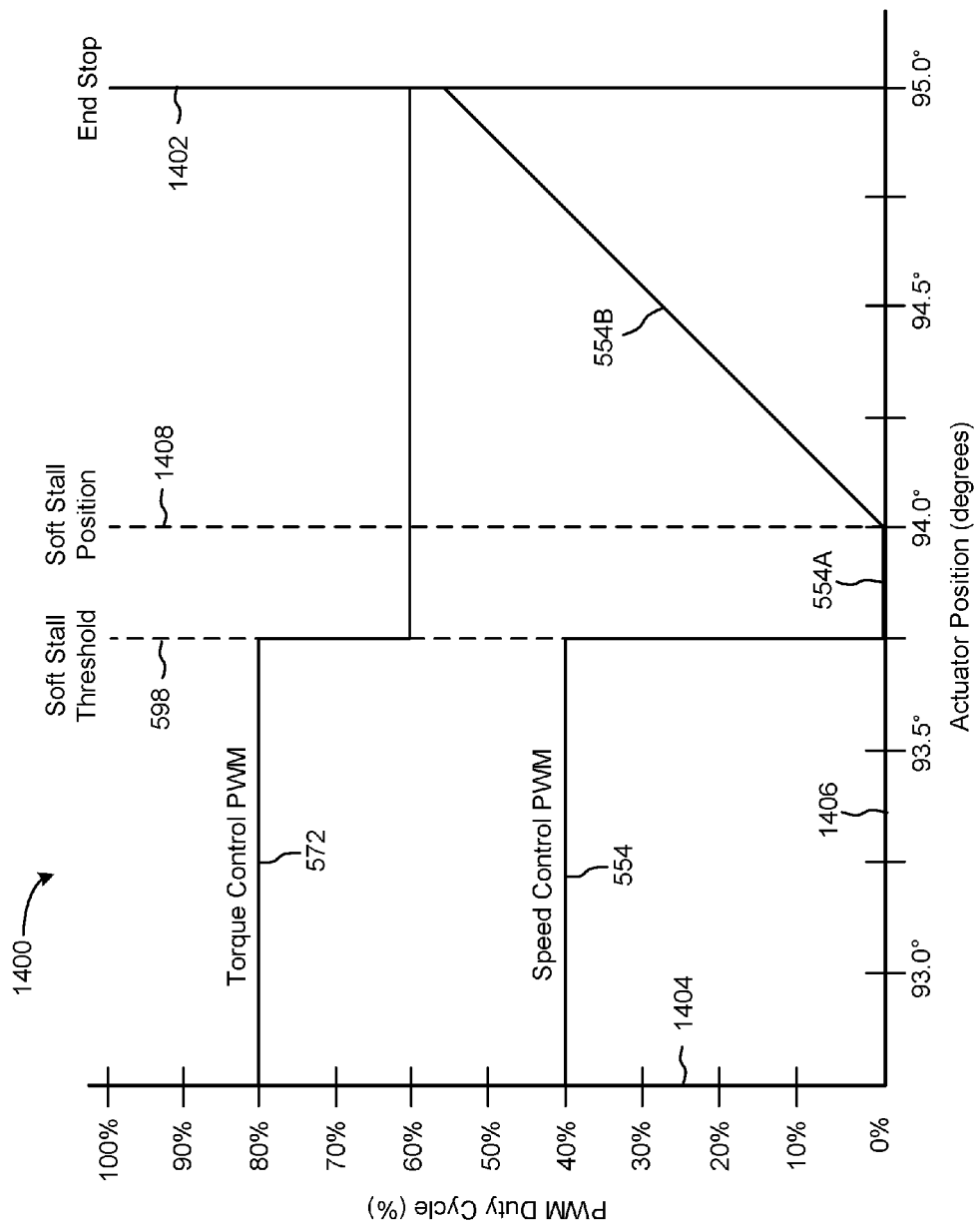
FIG. 14 is a graph illustrating a soft stall technique which may be used by the actuator of FIGS. 5-7 when approaching an end stop, according to an exemplary embodiment.

Referring now to FIG. 14, a graph 1400 illustrating the PWM outputs provided by processing circuit 530 is shown, according to an exemplary embodiment. Graph 1400 illustrates the behavior of the speed control PWM output 554 (provided by PWM speed controller 538) and the torque control PWM output 572 (provided by PWM torque controller 540) as actuator 500 approaches an end stop 1402. The vertical dimension of graph 1400 indicates the PWM duty cycle 1404 of PWM outputs 554 and 572 (e.g., duty cycle percentage). The horizontal dimension of graph 1400 indicates the actuator position 1406, which may be measured by motor/actuator position 592. In graph 1400, actuator position 1406 represents the angular position of drive device 510 (e.g., actuator stroke). The lines representing speed control PWM output 554 and torque control PWM output 572 illustrate the relationship between PWM duty cycle 1404 and actuator position 1406 for each of the PWM outputs 554 and 572.

In graph 1400, end stop 1402 has a known location at an actuator position of approximately 95.0°. The location of end stop 1402 may be determined by end stop locator 580, as described with reference to FIG. 13. Threshold calculator 582 may use the location of end stop 1402 to determine a soft stall threshold 598. In graph 1400, soft stall threshold 598 is located at an actuator position of approximately 93.75°, which is approximately 1.25° from the location of end stop 1402. In some embodiments, actuator 500 has multiple end stops 1402. For example, actuator 500 may have another end stop at the other end of the range of movement of drive device 510 (e.g., at an actuator position of 0.0°). Threshold calculator 582 may use the location of the other end stop to determine another soft stall threshold (e.g., at an actuator position of 1.25°).

As actuator position 1406 increases toward end stop 1402, PWM speed controller 538 generates speed control PWM output 554 and provides speed control PWM output 554 to BLDC motor 550 (e.g., via motor drive inverter 548). When actuator position 1406 is less than soft stall threshold 598, speed control PWM output 554 may be controlled to achieve a motor/actuator position and/or speed specified by control signal 564. For example, graph 1400 shows speed control PWM output 554 having a duty cycle of approximately 40% when actuator position 1406 is less than soft stall threshold 598. The duty cycle of 40% may be selected by PWM speed controller 538 in order to achieve a motor/actuator position and/or speed specified by control signal 564.

When actuator position 1406 reaches soft stall threshold 598, speed control PWM output 554 may drop to zero, shown in FIG. 14 as PWM output 554A. Setting speed control PWM output 554 to zero may completely stop motor commutation and may cause BLDC motor 550 to stall (i.e., stop rotating) prior to reaching end stop 1402. The momentum of BLDC motor 550 may cause BLDC motor 550 to continue rotating without commutation past soft stall threshold 598. For example, graph 1400 shows actuator position 1406 increasing from soft stall threshold 598 to a soft stall position 1408 while PWM output 554 is held at zero. At soft stall position 1408, BLDC motor 550 stops rotating as a result of PWM output 554 dropping to zero.

Once BLDC motor 550 has stopped, PWM speed controller 538 may ramp-up speed control PWM 554, shown in FIG. 14 as PWM output 554B. PWM output 554B may increase until actuator position 1406 reaches end stop 1402. In some embodiments, PWM output 554B increases linearly as a function of actuator position 1406. In other embodiments, PWM output 554B increases nonlinearly (e.g., in a step-up manner) or as a function of time. PWM output 554B may be provided to BLDC motor 550 (e.g., via motor drive inverter 548). Ramping-up PWM output 554 may cause the speed of BLDC motor 550 to increase as actuator 500 approaches end stop 1402.

In some embodiments, torque control PWM output 572 is decreased by PWM torque controller 572 when actuator position 1406 reaches soft stall threshold 598. For example, FIG. 14 shows torque control PWM output 572 dropping from approximately 80% to approximately 60% when actuator position 1406 reaches soft stall threshold 598. In other embodiments, torque control PWM output 572 may be maintained at a substantially constant value (e.g., 80%) when soft stall threshold 598 is reached.

In some embodiments, torque control PWM output 572 is increased when PWM output 554B is provided. Increasing torque control PWM output 572 may facilitate restarting BLDC motor 550. The increased value for torque control PWM output 572 may allow an increased electric current to flow through BLDC motor 550. Since BLDC motor 550 is not rotating at soft stall position 1408, BLDC motor 550 may not provide any back EMF, which can result in a large electric current flowing through BLDC motor 550 when speed control PWM output 554 is ramped-up. Increasing torque control PWM output 572 may allow the electric current through BLDC motor 550 to be increased to a startup value (i.e., a value higher than a normal operating current) until BLDC motor 550 begins rotating and starts producing a back EMF. In some embodiments, torque control PWM output 572 is only increased if the value of PWM output 572 at soft stall position 1408 is less than a predetermined startup value. For example, FIG. 14 illustrates an implementation in which PWM output 572 is not increased because PWM output 572 is already set to a value sufficient to restart BLDC motor 550.

Figure 15:
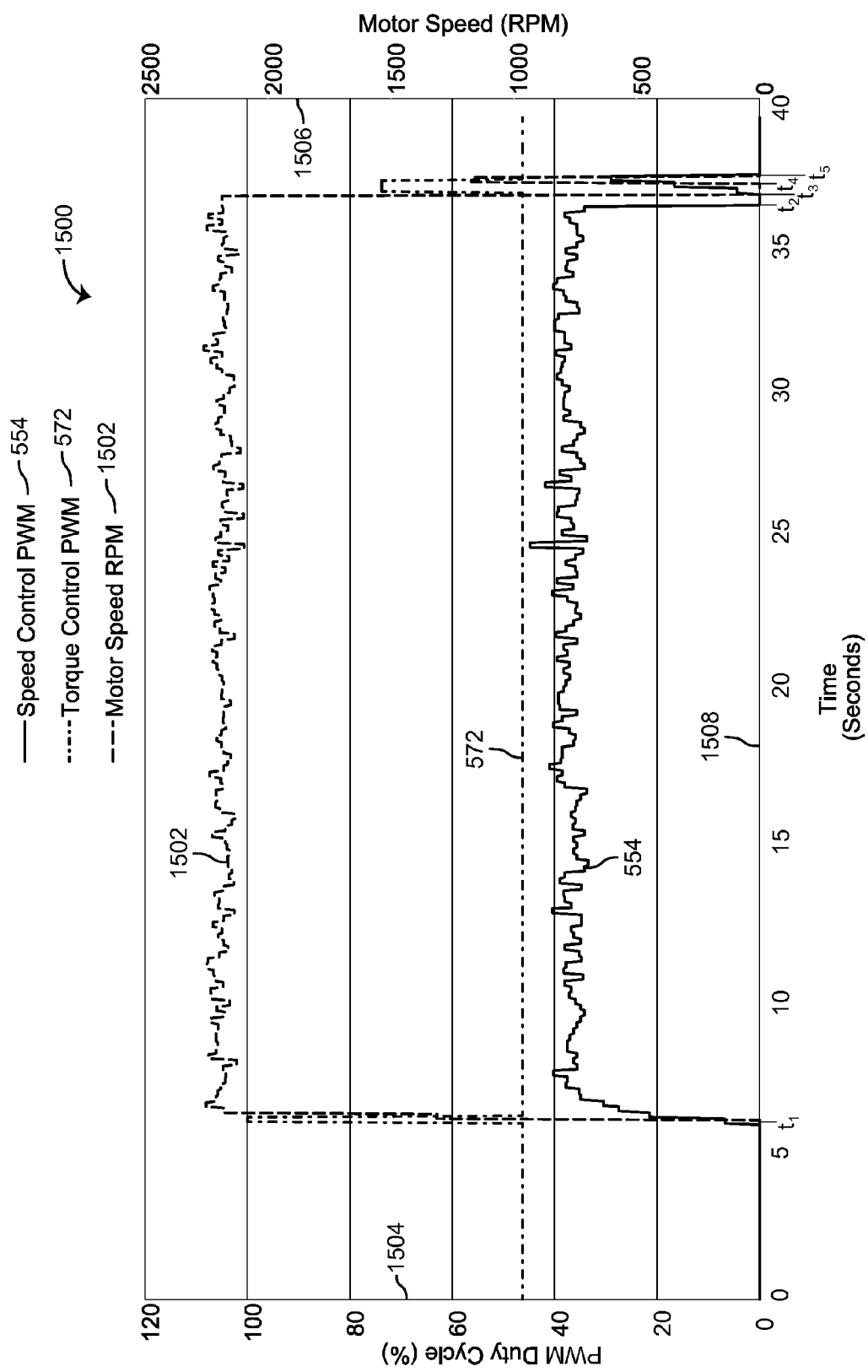
FIG. 15 is another graph illustrating the soft stall technique which may be used by the actuator of FIGS. 5-7 when approaching an end stop, according to an exemplary embodiment.

Referring now to FIG. 15, another graph 1500 illustrating the soft stall process performed by actuator 500 is shown, according to an exemplary embodiment. Graph 1500 illustrates the behavior of the speed control PWM output 554 (provided by PWM speed controller 538), the torque control PWM output 572 (provided by PWM torque controller 540), and the speed of BLDC motor 550 as actuator 500 moves drive device 510 toward an end stop. Axis 1504 indicates the PWM duty cycle of PWM outputs 554 and 572. Axis 1506 indicates the rotational speed of BLDC motor 550 in revolutions per minute (RPM). Axis 1508 indicates time. The rotational speed of BLDC motor 550 is shown as motor speed 1502.

Prior to time $t_1$, actuator 500 is stationary. Speed control PWM output 554 is held at zero, which results in a motor speed 1502 of zero. When actuator 500 is stationary, torque control PWM output 572 may be held at an operating value, shown in FIG. 15 as having a duty cycle of approximately 45%.

At time $t_1$, actuator 500 receives a signal to move drive device 510 to an end position. Main actuator controller 536 responds to the signal by increasing torque control PWM output 572 to a startup value (e.g., 100% duty cycle) and increasing speed control PWM output 554. Increasing speed control PWM output 554 results in BLDC motor 550 beginning to rotate. For example, FIG. 15 shows motor speed 1502 increasing to approximately 2200 RPM as a result of increasing speed control PWM output 554. Once motor speed 1502 reaches a minimum operating value, torque control PWM 572 may be returned to the normal operating value (e.g., 45% duty cycle). The value of PWM output 554 may be adjusted by PWM speed controller 538 to achieve a setpoint speed for BLDC motor 550 and/or drive device 510. In some embodiments, PWM speed controller 538 uses measurements of motor speed 1502 as a feedback signal in a closed-loop control process to adjust PWM output 554.

At time $t_2$, the position of drive device 510 reaches a soft stall threshold 598. Reaching the soft stall threshold 598 causes PWM speed controller 538 to set speed control PWM output 554 to zero, which completely stops motor commutation. The momentum of BLDC motor 550 causes BLDC motor 550 to continue rotating past time $t_2$ until BLDC motor 550 comes to a stop at time $t_3$.

At time $t_3$, BLDC motor 550 stops rotating and motor speed 1502 reaches a value of zero. Feedback from position sensors 552 may be used to determine when BLDC motor 550 stops rotating. At time $t_3$, main actuator controller 536 increases torque control PWM output 572 to a restart value (e.g., 70% duty cycle) and ramps-up speed control PWM output 554. Speed control PWM output 554 may continue ramping-up until the end stop is reached.

At time $t_4$, BLDC motor 550 begins rotating and motor speed 1502 increases as drive device 510 approaches the end stop. Motor speed 1502 may continue to increase until the end stop is reached. Once motor speed 1502 reaches a minimum operating value, torque control PWM 572 output may be returned to the normal operating value (e.g., 45% duty cycle).

At time $t_s$, the end stop is reached. Upon reaching the end stop, drive device 510 can travel no further. BLDC motor 550 stalls and motor speed 1502 drops to zero. Main actuator controller 536 may detect when BLDC motor 550 stalls by monitoring motor/actuator speed 594. Once BLDC motor 550 has stalled, speed control PWM output may be set to zero and actuator 500 may become stationary. Actuator 500 may remain stationary until another control signal is received at input connection 520.

Soft Stall Control Processes

Figure 16:
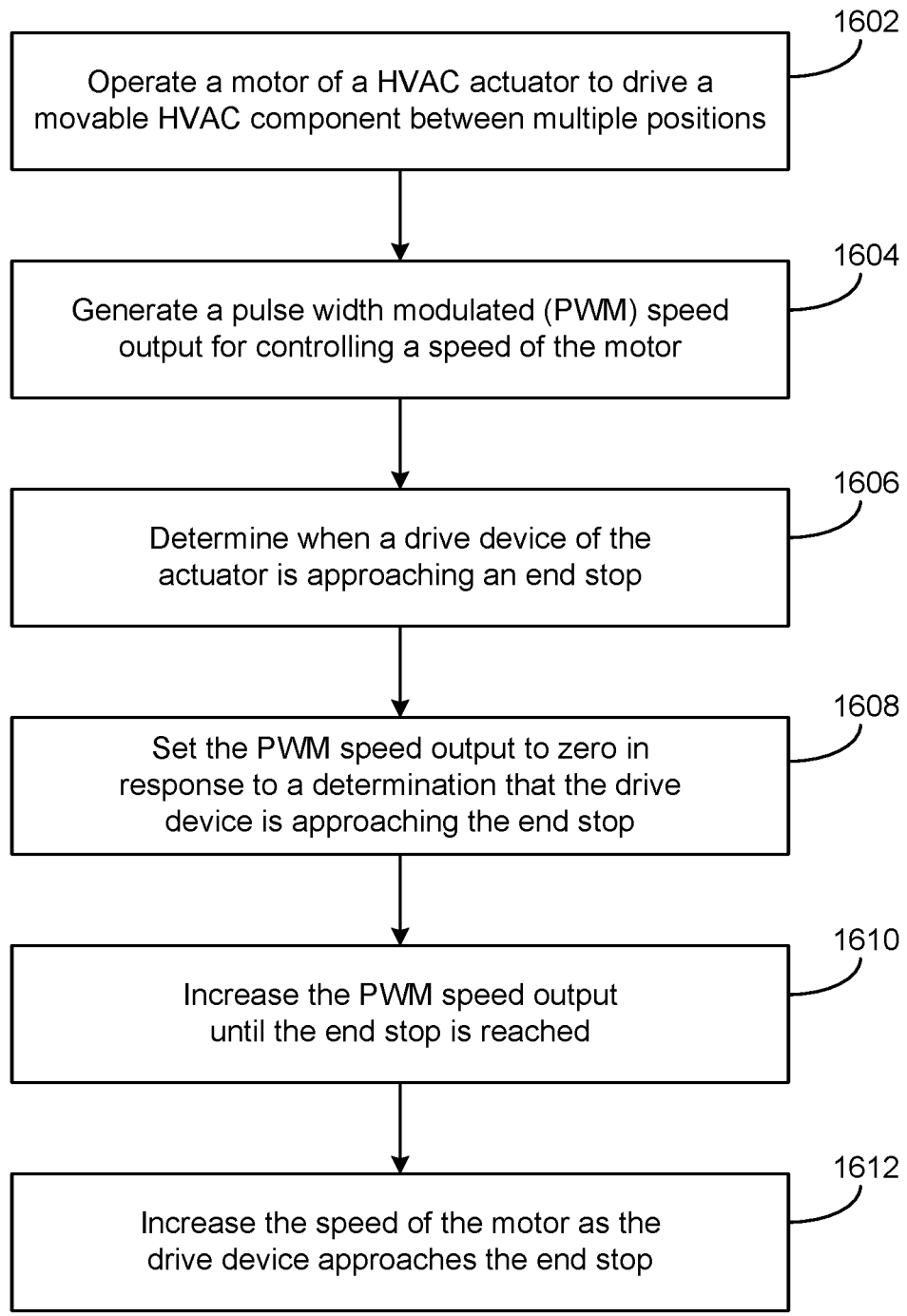
FIG. 16 is a flowchart of a soft stall process which may performed by the actuator of FIGS. 5-7 when approaching an end stop, according to an exemplary embodiment.

Referring now to FIG. 16, a flowchart of a process 1600 for controlling a HVAC actuator is shown, according to an exemplary embodiment. In some embodiments, the HVAC actuator is the same or similar to actuator 500, as described with reference to FIGS. 5-13. The actuator may be a damper actuator, a valve actuator, a fan actuator, a pump actuator, or any other type of actuator that can be used in a HVAC system or BMS. The actuator may be a linear actuator (e.g., a linear proportional actuator), a non-linear actuator, a spring return actuator, or a non-spring return actuator. Process 1600 may be performed by a processing circuit (e.g., processing circuit 530) of the HVAC actuator to control a motor of the actuator (e.g., BLDC motor 550). Process 1600 may be performed automatically by one or more components of processing circuit 530, as described with reference to FIGS. 5-13.

Process 1600 is shown to include operating a motor of a HVAC actuator to drive a movable HVAC component between multiple positions (step 1602). In some embodiments, the motor is a brushless direct current (BLDC) motor such as BLDC motor 550. The motor may be coupled to a drive device (e.g., drive device 510), which may be connected to the movable HVAC component. The drive device may be configured to receive a shaft of a damper, a valve, or any other movable HVAC system component in order to drive (e.g., rotate) the shaft. Operating the motor may cause a corresponding movement of the drive device, which causes the HVAC component to move between the multiple positions.

Process 1600 is shown to include generating a pulse width modulated (PWM) speed output for controlling a speed of the motor (step 1604). The PWM speed output may be a PWM DC voltage output (e.g., PWM output 554). In some embodiments, the PWM speed output is generated by a PWM speed controller such as PWM speed controller 538, as described with reference to FIGS. 8-13. The PWM speed output may be provided as an input to the motor. The duty cycle of the PWM speed output may determine the speed of the motor. The width of the PWM speed output's PWM pulses can be adjusted by the PWM speed controller to achieve varying commanded motor speeds and/or to obtain varying motor or actuator positions.

Process 1600 is shown to include determining when a drive device of the actuator is approaching an end stop (step 1606). Step 1606 may include determining that the drive device is approaching the end stop when the position of the drive device reaches a soft stall threshold (e.g., soft stall threshold 598). The soft stall threshold may be a predetermined distance from the location of the end stop. As such, step 1606 may include determining the position of the drive device, identifying the location of the end stop, generating the soft stall threshold based on the location of the end stop, and comparing the position of the drive device with the soft stall threshold.

In some embodiments, step 1606 includes determining the position of the drive device. The position of the drive device may be determined using position signals from one or more position sensors (e.g., position sensors 552). The position sensors may be Hall effect sensors, potentiometers, optical sensors, or any other type of sensor configured to measure a position of the motor, the drive device, and/or the HVAC component connected to the drive device. The position of the drive device may be determined in terms of Hall sensor counts, motor revolutions, motor position, drive device position, or any other unit that can be used to quantify the position of the motor, the drive device, and/or the HVAC component. For example, the position of the drive device may be determined as a number of degrees of rotation of the drive device relative to a fixed position (e.g., a zero location, a mechanical end stop, etc.), a number of revolutions of the motor, a number of Hall sensor counts, etc.

In some embodiments, step 1606 includes identifying the location of the end stop. The end stop may define an end points on a physical range of movement for the drive device. The end stop may be a mechanical end stop or a software-defined end stop (e.g., a user-defined location stored in memory). If the end stop is a software defined end stop, step 1606 may include identifying the end stop location by retrieving the end stop location from memory. However, if the end stop is a are mechanical end stop, step 1606 may include performing an automatic calibration procedure to identify the end stop location.

The automatic calibration sequence may be run to identify the mechanical end stop locations for both counterclockwise and clockwise rotation. For example, the automatic calibration sequence may include operating the motor in one direction until the mechanical end of travel is reached. The position of the drive device at the mechanical end of travel may be stored as the location of the end stop. In some embodiments, the automatic calibration sequence includes operating the motor in the opposite direction until another mechanical end of travel is reached. The position of the drive device at the other mechanical end of travel may be stored as the location of the other end stop.

In some embodiments, step 1606 includes generating a soft stall threshold based on the location of the end stop. The soft stall threshold may be generated by adding or subtracting a predetermined value N from the end stop location. The predetermined value N may be a number of Hall counts, a number of motor revolutions, a number of degrees of rotation of the drive device, or any other unit in which the position of the drive device can be quantified. In some embodiments, the predetermined value N is approximately 99 Hall counts, which may translate into approximately three motor revolutions.

In some embodiments, step 1606 includes comparing the position of the drive device with the soft stall threshold. Step 1606 may determine that the drive device is approaching the end stop when the position of the drive device reaches the soft stall threshold. In some embodiments, step 1606 includes determining that the drive device is approaching the end stop when the drive device crosses the soft stall threshold while moving toward the end stop location.

Still referring to FIG. 16, process 1600 is shown to include setting the PWM speed output to zero in response to a determination that the drive device is approaching the end stop (step 1608). Step 1608 may include setting the magnitude of the PWM speed output to zero, preventing the PWM speed output from reaching the motor, or otherwise interrupting or changing the PWM speed output such that the motor receives zero input voltage across the motor's windings. Setting the PWM speed output to zero may stop motor commutation, which causes the motor to stop. In some embodiments, step 1606 includes providing a speed setpoint of zero to the PWM speed controller. The PWM speed controller may use the zero speed setpoint to set the PWM speed output to a duty cycle of 0%.

Process 1600 is shown to include increasing the PWM speed output until the end stop is reached (step 1610) and increasing the speed of the motor as the drive device approaches the end stop (step 1612). In some embodiments, steps 1610 and 1612 are performed in response to a determination that the motor has stopped after the PWM speed output is set to zero. Step 1610 may include ramping-up the PWM speed output linearly (as shown in FIG. 14.), nonlinearly, or otherwise increasing the PWM speed output (e.g., in a step-wise manner). In some embodiments, the PWM speed output is increased continuously or incrementally until the end stop is reached. Increasing the PWM speed output may cause the motor speed to increase. Accordingly, step 1612 may be an automatic consequence of step 1612. The speed of the motor may continue to increase as the drive device approaches the end stop until the end stop is reached.

Unlike conventional techniques which merely slow down the speed of the motor as the drive device approaches an end stop, process 1600 completely stops motor commutation. Once the motor has completely stopped, process 1600 causes the PWM speed output to increase, which increases the speed of the motor until the mechanical end of travel is reached. As such, process 1600 does not slow down the speed of the motor while approaching the end stop, but rather completely stops the motor and then increases the speed of the motor until the end stop is reached. Advantageously, process 1600 may reduce the impulse force seen at the mechanical end stop, thereby increasing the longevity of the mechanical gear train.

Figure 17:
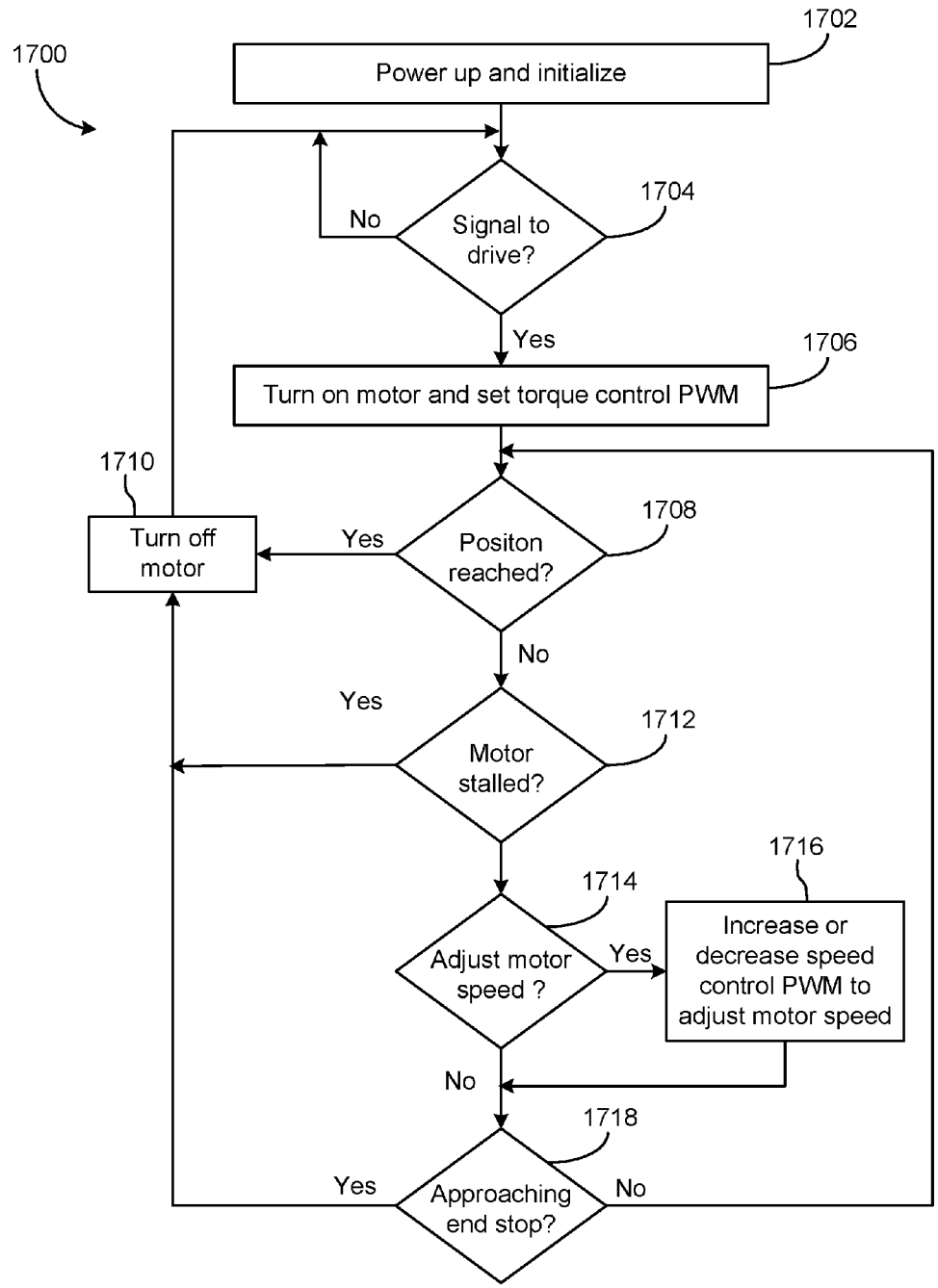
FIG. 17 is a flowchart of another soft stall process which may performed by the actuator of FIGS. 5-7 when approaching an end stop, according to an exemplary embodiment.

Referring now to FIG. 17, a flowchart of another process 1700 controlling a HVAC actuator is shown, according to an exemplary embodiment. In some embodiments, the HVAC actuator is the same or similar to actuator 500, as described with reference to FIGS. 5-13. The actuator may be a damper actuator, a valve actuator, a fan actuator, a pump actuator, or any other type of actuator that can be used in a HVAC system or BMS. The actuator may be a linear actuator (e.g., a linear proportional actuator), a non-linear actuator, a spring return actuator, or a non-spring return actuator. Process 1700 may be performed by a processing circuit (e.g., processing circuit 530) of the HVAC actuator to control a motor of the actuator (e.g., BLDC motor 550). Process 1700 may be performed automatically by one or more components of processing circuit 530, as described with reference to FIGS. 5-13.

Process 1700 is shown to include powering up and initializing the actuator (step 1702) and determining whether a signal to drive the actuator is received (step 1704). The signal to drive the actuator may be received as a control signal (e.g., control signal 564) from a controller, a user device, or any other external system or device. The signal to drive the actuator may command the actuator to achieve a specified position and/or a specified operating speed. Step 1704 may be repeated periodically until a signal to drive the actuator is received.

Process 1700 is shown to include turning on the motor and setting the torque control PWM output (step 1706). In some embodiments, the motor is a brushless direct current (BLDC) motor such as BLDC motor 550. The motor may be coupled to a drive device (e.g., drive device 510), which may be connected to a movable HVAC component. The drive device may be configured to receive a shaft of a damper, a valve, or any other movable HVAC system component in order to drive (e.g., rotate) the shaft. Turning on the motor may cause a corresponding movement of the drive device, which causes the HVAC component to move.

Setting the torque control PWM output may include increasing the torque control PWM output to a startup value to allow an increased electric current to flow through the motor while the motor is started. In some embodiments, step 1706 includes determining whether the torque control PWM output is less than a predetermined startup value. If the torque control PWM is less than the predetermined startup value, the torque control PWM may be increased to the startup value. However, if the torque control PWM is greater than or equal to the startup value, the torque control PWM may not be increased further.

Process 1700 is shown to include determining whether the specified position has been reached (step 1708). The specified position may be included in the command or control signal received in step 1704. In some embodiments, step 1708 includes determining the position of the drive device. The position of the drive device may be determined using position signals from one or more position sensors (e.g., position sensors 552). The position sensors may be Hall effect sensors, potentiometers, optical sensors, or any other type of sensor configured to measure a position of the motor, the drive device, and/or the HVAC component connected to the drive device. The position of the drive device may be determined in terms of Hall sensor counts, motor revolutions, motor position, drive device position, or any other unit that can be used to quantify the position of the motor, the drive device, and/or the HVAC component. For example, the position of the drive device may be determined as a number of degrees of rotation of the drive device relative to a fixed position (e.g., a zero location, a mechanical end stop, etc.), a number of revolutions of the motor, a number of Hall sensor counts, etc.

The position of the drive device may be compared to the specified position received in step 1704 to determine whether the specified position has been reached. If the specified position has been reached, the motor may be turned off (step 1710). However, if the specified position has not been reached, process 1700 may proceed to determining whether the motor has stalled (step 1712). If the motor has stalled, the motor may be turned off (step 1710). However, if the motor has not stalled, process 1700 may proceed to step 1714.

Process 1700 is shown to include determining whether to adjust the motor speed (step 1714). Step 1714 may include measuring or calculating the current speed of the motor. In some embodiments, the motor speed is calculated using on a difference between two or more of the positions measured by the position sensors. For example, step 1714 may include dividing the difference in position by a time that elapses between the position measurements to calculate the speed of the motor. The speed of the motor may be determined in terms of a Hall sensor count rate (e.g., Hall counts per second), motor revolutions per second, drive device speed (e.g., degrees per second), or any other unit that can be used to quantify the speed of the motor and/or the drive device. The motor speed may be compared to a predetermined or specified motor speed setpoint to determine whether to adjust the motor speed.

Process 1700 is shown to include increasing or decreasing the speed control PWM output to adjust the motor speed (step 1716). Increasing or decreasing the speed control PWM output may include adjusting the PWM duty cycle, which adjusts the average voltage provided to the motor. Since the voltage provided to a DC motor is directly proportional to the motor speed, increasing or decreasing the speed control PWM output may cause the motor speed to increase or decrease proportionally.

Process 1700 is shown to include determining whether the drive device is approaching an end stop (step 1718). Step 1718 may be the same or similar to step 1606 of process 1600. If the drive device is not approaching the end stop, process 1700 may return to step 1708. Steps 1708-1718 may be repeated until the drive device is within a predetermined distance of the end stop (i.e., the soft stall threshold). Once the drive device reaches the soft stall threshold, step 1718 may determine that the drive device is approaching the end stop. If step 1718 determines that the drive device is approaching the end stop, the speed control PWM output may be set to zero, which causes the motor to turn off (step 1710). The speed control PWM output may then be increased until the end stop is reached. Increasing the speed control PWM output may cause the motor speed to increase as the drive device approaches the end stop.

Automatic Stroke Length Recalibration System

Figure 18:
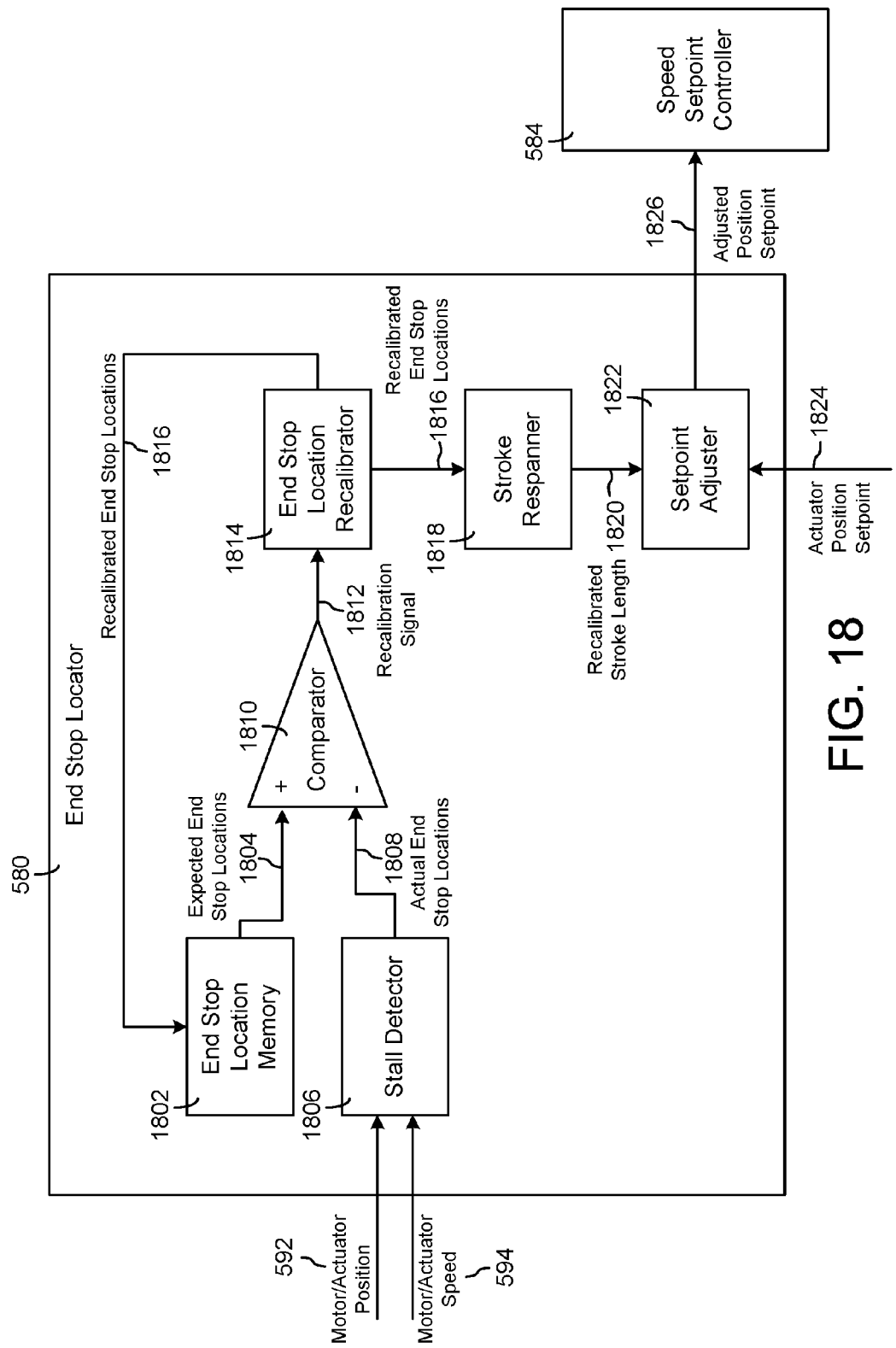
FIG. 18 is a block diagram illustrating an end stop locator of the actuator of FIGS. 5-7 in greater detail, according to an exemplary embodiment.

Referring now to FIG. 18, a block diagram illustrating end stop locator 580 in greater detail is shown, according to an exemplary embodiment. As previously described, end stop locator 580 may be configured to identify the locations of one or more end stops of actuator 500 and/or end stops of a HVAC component connected to actuator 500. The end stops may define end points on a physical range of movement for drive device 510.

FIG. 18 illustrates an exemplary automatic stroke length recalibration sequence which may be used by end stop locator 580 to recalibrate the end stop locations of actuator 500. In brief overview, end stop locator 580 may use the identified end stop locations stored in end stop location memory 1802 to set expected end stop locations 1804. Stall detector 1806 may then use motor/actuator position 592 and/or motor/actuator speed 594 to identify actual end stop locations 1808. Comparator 1810 may compare expected end stop locations 1804 to actual end stop locations 1808. If expected end stop locations 1804 and actual end stop locations 1808 do not match, end stop location recalibrator 1814 may determine and set recalibrated end stop locations 1816. Using recalibrated end stop locations 1816, stroke respanner 1818 may determine and set recalibrated stroke length 1820. Setpoint adjuster 1822 may use recalibrated stroke length 1820 along with actuator position setpoint 1824 to determine and output an adjusted position setpoint 1826. Adjusted position setpoint 1826 is then input into speed setpoint controller 584 to determine an appropriate speed setpoint for BLDC motor 550.

Unlike conventional techniques that require operator input in order to recalibrate the stroke length of a drive device, end stop locator 580 may be configured to automatically run an automatic stroke length recalibration sequence in order to identify the mechanical end stop locations for both counterclockwise and clockwise rotation. This sequence may be performed when drive device 510 encounters an unexpected end stop location. Drive device 510 may encounter unexpected end stop locations when the drive device stroke length is either shortened or lengthened for various reasons. For example, ice or other debris may build up in the mechanical path of travel, shortening the stroke length and preventing drive device 510 from reaching expected end stop locations. In other cases, wearing on the seat of a valve or compression on the seal of a damper may increase the stroke length, causing drive device 510 to exceed expected end stop locations. End stop locator 580 may automatically detect such occurrences and perform an automatic stroke length recalibration without requiring a user to initiate the recalibration.

Once the stroke length has been recalibrated, the previously described soft stall technique may be implemented with the recalibrated end stop locations. The implementation of the soft stall technique may occur automatically, with no operator input required. Advantageously, this may reduce the impulse force seen at the mechanical end stop, thereby increasing the longevity of the mechanical gear train without the need to change the physical gearbox design.

Still referring to FIG. 18, end stop locator 580 is shown to include end stop location memory 1802. End stop location memory 1802 may be configured to store the identified end stop locations of one or more end stops of actuator 500 and/or end stops of a HVAC component connected to actuator 500. In various embodiments, the end stops may be software-defined end stops (e.g., user-defined locations) stored in memory or physical/mechanical ends of travel. Once retrieved from memory, end stop location memory 1802 sets expected end stop locations 1804.

In some embodiments, end stop location memory 1802 may store end stop locations in terms of the number of Hall sensor counts (a metric that quantifies motor/actuator position 592) at each end stop location. Hall counts may be added when drive device 510 rotates in a first direction and subtracted when drive device 510 rotates in a second direction, opposite the first direction. End stop location memory 1802 may store a first end stop location variable $HallCount_1$ as the number of Hall counts at one of the mechanical ends of travel. In some embodiments, $HallCount_1$ is the minimum number of Hall counts and defines a first end stop location. End stop location memory 1802 may store a second end stop location variable $HallCount_2$ as the number of Hall counts at the other mechanical end of travel. In some embodiments, $HallCount_2$ is the maximum number of Hall counts and defines a second end stop location, with $HallCount_1 < HallCount_2$.

Still referring to FIG. 18, end stop locator 580 is shown to include a stall detector 1806. Stall detector 1806 may be configured to detect whether drive device 510 has stalled based on inputs from motor/actuator position 592 and/or motor/actuator speed 594. In various embodiments, motor/actuator position 592 may be defined in terms of Hall sensor counts, motor revolutions, motor position, drive device position, or any other unit that can be used to quantify the position of BLDC motor 550 and/or drive device 510. In some embodiments, stall detector 1806 may use motor/actuator position 592 to detect a stall in drive device 510 when motor/actuator position 592 has not changed for a specified period of time. Once a stall has been detected, stall detector 1806 may use motor/actuator position 592 to set actual end stop locations 1808.

In other embodiments, stall detector 1806 may be configured to detect a stall when motor/actuator speed 594 is equal to zero. In various embodiments, motor/actuator speed 594 may be defined in terms of a Hall sensor count rate (e.g., Hall counts per second), motor speed (e.g., revolutions per second), drive device speed (e.g., degrees per second), or any other unit that can be used to quantify the speed of BLDC motor 550 and/or drive device 510. In some embodiments, once a stall has been detected in drive device 510 because motor/actuator speed 594 is equal to zero, stall detector 1806 may be configured to set actual end stop locations 1808 based on motor/actuator position 592 at the time of stall.

Still referring to FIG. 18, end stop locator 580 is shown to include a comparator 1810. Comparator 1810 may be configured to monitor expected end stop locations 1804, set by end stop location memory 1802, relative to actual end stop locations 1808, set by stall detector 1806. The end stop locations may be compared by comparator 1810 in terms of Hall sensor counts, motor revolutions, motor position, drive device position, or any other unit that can be used to quantify the position of BLDC motor 550 and/or drive device 510. In the event that expected end stop locations 1804 do not match actual end stop locations 1808, comparator 1810 may provide a recalibration signal 1812 to end stop location recalibrator 1814. Comparator 1810 may be a discrete electronics part or implemented as part of end stop locator 580 or another controller that forms a part of processing circuit 530.

Still referring to FIG. 18, end stop locator 580 is shown to include end stop location recalibrator 1814. Upon receiving recalibration signal 1812 from comparator 1810, end stop location recalibrator 1814 may be configured to run an automatic calibration sequence to identify the mechanical end stop locations for both counterclockwise and clockwise rotation. In some embodiments, end stop location recalibrator 1814 may record the position at stall as a new end stop location for either clockwise or counterclockwise rotation.

In some embodiments, once the first end stop location has been recorded, end stop location recalibrator 1814 may operate the BLDC motor 550 in the opposite direction (e.g., as part of normal operation or as part of a calibration routine). Once another mechanical end of travel is reached, the motor/actuator's position may be recorded as another end stop location. End stop location recalibrator 1814 may set the recorded locations as recalibrated end stop locations 1816. Recalibrated end stop locations 1816 may be recorded in terms of Hall sensor counts, motor revolutions, motor positions, drive device positions, or any other unit that can be used to quantify the position of BLDC motor 550 and/or drive device 510.

Still referring to FIG. 18, end stop locator 580 is shown to include a stroke respanner 1818. Stroke respanner 1818 may be configured to determine and set recalibrated stroke length 1820 based on recalibrated end stop locations 1816. The stroke of actuator 500 quantitatively represents the full length of mechanical travel the actuator is capable of achieving based on the end stop locations and may be calculated by determining the distance between the recalibrated mechanical end stop locations. Stroke respanner 1818 may calculate the value of recalibrated stroke length 1820 in terms of Hall sensor counts, motor revolutions, motor positions, drive device positions, or any other unit that can be used to quantify the distance between recalibrated end stop locations 1816.

Still referring to FIG. 18, end stop locator 580 is shown to include setpoint adjuster 1822. Setpoint adjuster 1822 may be configured to generate adjusted position setpoint 1826 using recalibrated stroke length 1820 and actuator position setpoint 1824. Actuator position setpoint 1824 may indicate the desired position of drive device 510 as a number of degrees of rotation of drive device 510 relative to a fixed position (e.g., a zero location, a mechanical end stop, etc.), a number of revolutions of BLDC motor 550, a number of Hall sensor counts, a percentage, etc. For example, actuator position setpoint 1824 may specify an actuator position of 50% open. In some embodiments, position setpoint 1824 is provided as a DC voltage signal (e.g., 0 V-10 V). Setpoint adjuster 1822 may use recalibrated stroke length 1820 and signal actuator position 1824 to generate position setpoint 1826 in terms of a number of Hall counts, motor revolutions, or any other metric that allows setpoint adjuster 1822 to define a particular location relative to the recalibrated end stop locations. For example, position setpoint 1824 may be provided as a DC voltage signal of 6 V, which may correspond to an actuator position of 60% open. Setpoint adjuster 1822 may use recalibrated stroke length 1820 to generate position setpoint 1826 that is 60% open based on the recalibrated stroke length.

In some embodiments, adjusted position setpoint 1826 may be a component of control signal 564. Other components of control signal 564 may originate from input connection 520 (e.g., speed setpoints, etc.). As previously described, speed setpoint controller 584 may use control signal 564 to determine an appropriate speed setpoint 566 for BLDC motor 550 and implement the soft stall technique.

Figure 19:
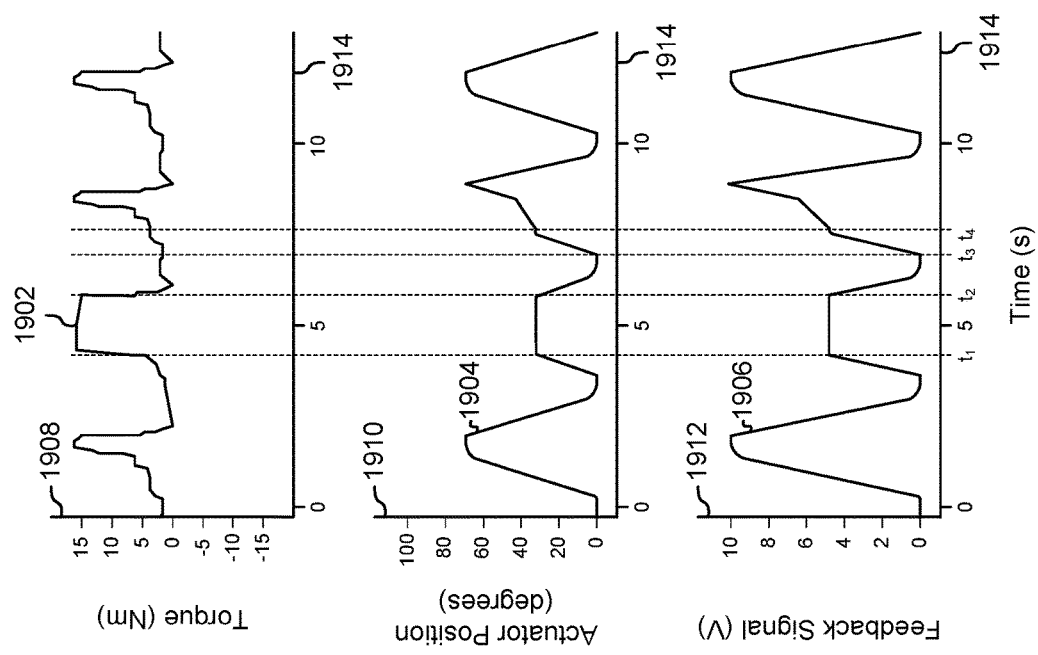
FIG. 19 is a graph illustrating the stroke length recalibration process which may be performed by the actuator of FIGS. 5-7 when the stroke length is shorter than expected due to a stall while traveling in a clockwise direction, according to an exemplary embodiment.

Referring now to FIG. 19, a graph 1900 illustrating the automatic stroke length recalibration process performed by actuator 500 when drive device 510 encounters an unexpected stall is shown, according to an exemplary embodiment. Graph 1900 illustrates the behavior of torque output 1902, actuator position 1904, and feedback signal 1906 as drive device 510 encounters a stall while traveling in the clockwise direction. Graph 1900 also illustrates the automatic stroke length recalibration process that may be performed by end stop locator 580 in response to the detection of the stall.

Graph 1900 includes three vertical axes. Axis 1908 indicates the torque output 1902 of BLDC motor 550 in newton meters (N m). Axis 1910 indicates the actuator position 1904, which represents the angular position of drive device 510 (e.g., actuator stroke) in degrees. Although represented here in degrees, in other embodiments, actuator position 1904 may be represented as percentage open, a number of Hall counts, etc. Axis 1912 indicates the feedback signal 1906 in volts (V). In some instances, feedback signal 1906 may be a component of output connection 522. Horizontal axis 1914 indicates time in seconds.

Prior to time $t_1$, graph 1900 illustrates torque output 1902, actuator position 1904, and feedback signal 1906 when actuator 500 is functioning normally. During normal operation, actuator 500 may move drive device 510 between the expected end stop locations. In some instances, the expected end stop locations may be stored in end stop location memory 1802. Torque output 1902 reflects BLDC motor 550 ramping up to its maximum value as drive device 510 reaches the end stop location after traveling in a clockwise direction, and falling to its minimum value immediately after drive device 510 begins to travel in a counterclockwise direction. Feedback signal 1906 matches the shape of actuator position 1904: both resemble a sine wave, both reach their maximum values as drive device 510 reaches the end stop location after traveling in a clockwise direction, and both reach their minimum values as drive device 510 reaches the end stop location after traveling in a counterclockwise direction.

Prior to time $t_1$, graph 1900 also reflects the implementation of the soft stall feature. As previously described, the soft stall feature sets motor speed 1502 to a value of zero in anticipation of an end stop and then ramps up speed until the end stop is reached. In response, both actuator position 1904 and feedback signal 1906 do not reach their maximum and minimum values linearly but gradually, as indicated by the rounded shapes of both response curves.

At time $t_1$, drive device 510 encounters an unexpected end stop while traveling in a clockwise direction. The unexpected end stop serves to shorten the stroke length of drive device 510. An unexpected end stop may be caused by an obstruction in the path of drive device 510 before the mechanical end of travel is reached. In some instances, this obstruction may be due to ice or other debris that has built up in the path of drive device 510.

In response to the unexpected end stop at $t_1$, torque output 1902 reaches its maximum value prematurely. In addition, feedback signal 1906 outputs a value which corresponds linearly with actuator position 1904 at the time of stall. In other words, if the actuator stalls approximately halfway between the expected end stop location, feedback signal 1906 will stall at a value approximately half its maximum expected value. For example, as illustrated in graph 1900, if the normal stroke length of the actuator is 70° and this corresponds with feedback signal 1906 output of 10 V, when the actuator position 1904 stalls at 35°, feedback signal 1906 will output 5 V during the stall. In some instances, because the actuator and/or drive device may not be visible to the operator, the abnormal value of feedback signal 1906 may serve as an indication to the operator than an unexpected end stop has been encountered.

Between time $t_1$ and time $t_2$, while actuator position 1904 remains constant and drive device 510 is stalled, torque output 1902 and feedback signal 1906 are also held constant at their values at the point of stall. During this period, the stall may prompt the initiation of the automatic stroke length recalibration process. In some embodiments, stall detector 1806 within the end stop locator 580 processing circuit may detect the stall and prompt end stop locator 1814 to set the location of the stall as a new end stop location.

At time $t_2$, drive device 510 begins to travel in the counterclockwise direction, which continues until time $t_3$. In response to travel in the counterclockwise direction, torque output 1902 immediately drops to its minimum value. Between time $t_2$ and time $t_3$, both actuator position 1904 and feedback signal 1906 decrease linearly before the soft stall feature anticipates drive device 510 is reaching the end stop location. In response to the approach of the end stop, the plots of actuator position 1904 and feedback signal 1906 begin to round off until the end stop location is reached.

At time $t_3$, drive device 510 begins to travel in a clockwise direction again. This travel continues until time $t_4$, when drive device 510 approaches the location of previous stall (i.e., the recalibrated expected end stop location) and begins to implement the soft stall technique in response to the recalibrated end stop location. This is illustrated in graph 1900 by the transition of the plots of actuator position 1904 and feedback signal 1906 from a linear to a rounded shape at time $t_4$. However, graph 1900 illustrates a scenario in which, at some point between time $t_2$ and time $t_4$, the cause of the unexpected end stop has been removed, cleared, resolved, etc., such that the stroke of drive device 510 can resume its full length. As drive device 510 approaches time $t_4$, it begins to implement the soft stall technique, but the lack of obstruction means that drive device 510 can drive past the unexpected end stop location. The soft stall implementation causes the speed of drive device 510 to slow for a predetermined time (e.g., between two and four seconds) before resuming normal speed until drive device 510 reaches the expected end stop location. Because the soft stall technique was implemented at the unexpected end stop location (i.e., at time $t_4$), it is not implemented at the expected end stop location. However, once drive device 510 has reached the expected end stop location from the clockwise direction and resumes its full stroke length as it travels in the counterclockwise direction, the plots of torque output 1902, actuator position 1904, and feedback signal 1906 revert to the shapes and values associated with normal actuator operation (i.e., identical to the period prior to time $t_1$).

Figure 20:
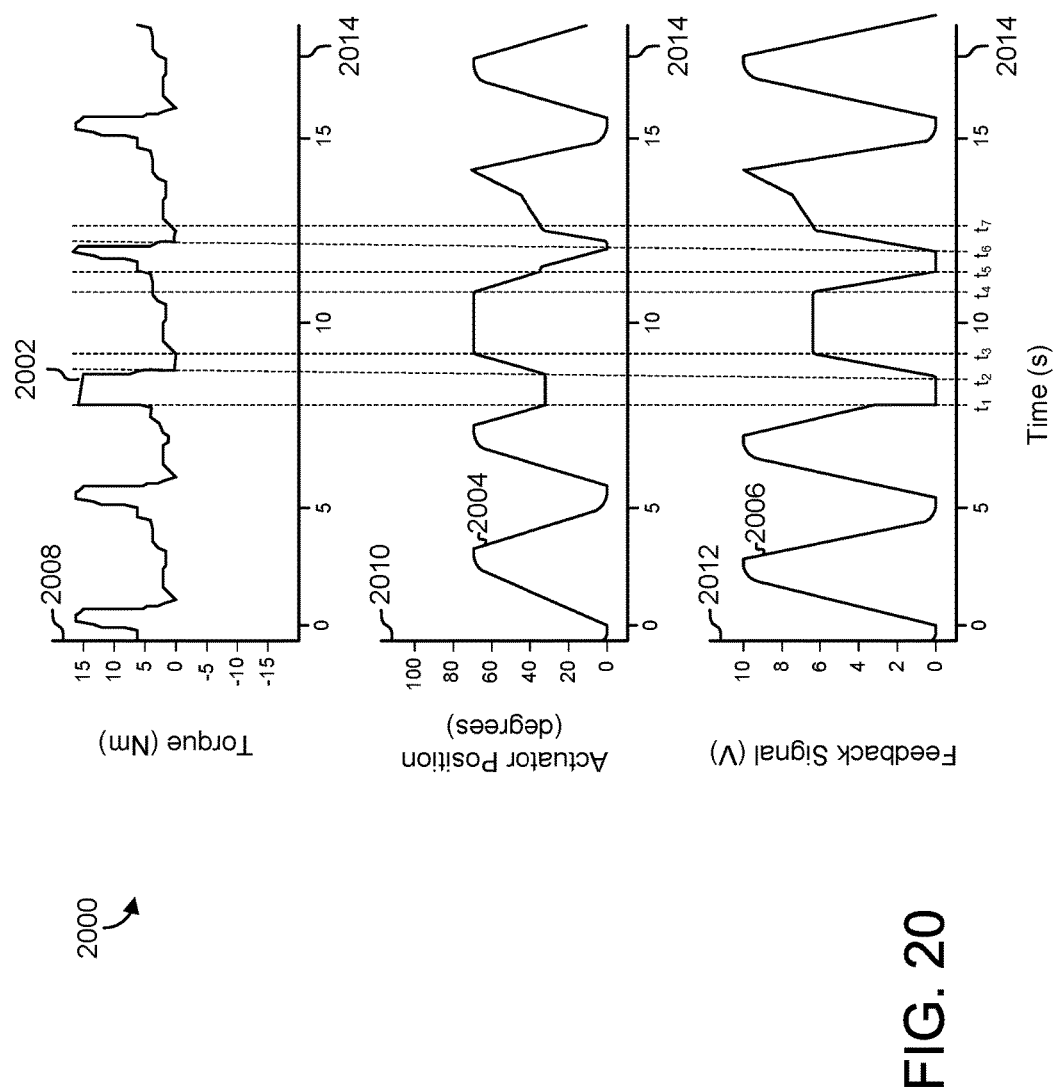
FIG. 20 is a graph illustrating the stroke length recalibration process which may be performed by the actuator of FIGS. 5-7 when the stroke length is shorter than expected due to a stall while traveling in a counterclockwise direction, according to an exemplary embodiment.

Referring now to FIG. 20, another graph 2000 illustrating the automatic stroke length recalibration process performed by actuator 500 when drive device 510 encounters an unexpected stall is shown, according to an exemplary embodiment. Graph 2000 illustrates the behavior of the torque output 2002, the actuator position 2004, and feedback signal 2006 as drive device 510 encounters a stall while traveling in the counterclockwise direction. Graph 2000 also illustrates the automatic stroke length recalibration process that may be performed by end stop locator 580 in response to the detection of the stall.

Graph 2000 includes three vertical axes. Axis 2008 indicates the torque output 2002 of BLDC motor 550 in newton meters (N m). Axis 2010 indicates the actuator position 2004, which represents the angular position of drive device 510 (e.g., actuator stroke) in degrees. Although represented here in degrees, in other embodiments, actuator position 2004 may be represented as percentage open, number of Hall counts, etc. Axis 2012 indicates the feedback signal 2006 in volts (V). In some instances, feedback signal 2006 may be a component of output connection 522. Horizontal axis 2014 indicates time in seconds.

Prior to time $t_1$, graph 2000 illustrates torque output 2002, actuator position 2004, and feedback signal 2006 when actuator 500 is functioning normally. During normal operation, actuator 500 may move drive device 510 between the expected end stop locations. In some instances, the expected end stop locations may be stored in end stop location memory 1802. Torque output 2002 reflects BLDC motor 550 ramping up to its maximum value as drive device 510 reaches the end stop location after traveling in a counterclockwise direction, and falling to its minimum value immediately after drive device 510 begins to travel in a clockwise direction. Feedback signal 2006 matches the shape of actuator position 2004 during normal operation: both resemble a sine wave, both reach their maximum values as drive device 510 reaches the end stop location after traveling in a clockwise direction, and both reach their minimum values as drive device 510 reaches the end stop location after traveling in a counterclockwise direction.

Prior to time $t_1$, graph 2000 also reflects the implementation of the soft stall feature. As previously described, the soft stall feature sets motor speed 1502 to a value of zero in anticipation of an end stop and then ramps up speed until the end stop is reached. In response, both actuator position 2004 and feedback signal 2006 do not reach their maximum and minimum values linearly but gradually, as indicated by the rounded shapes of both response curves.

At time $t_1$, drive device 510 encounters an unexpected end stop while traveling in a counterclockwise direction. The unexpected end stop serves to shorten the stroke length of drive device 510. An unexpected end stop may be caused by an obstruction in the path of drive device 510 before the mechanical end of travel is reached. In some instances, this obstruction may be due to ice or other debris that has built up in the path of drive device 510.

In response to the unexpected end stop at $t_1$, torque output 2002 reaches its maximum value prematurely. In addition, feedback signal 2006 drops to a value of 0 V. This may be caused by end stop recalibrator 1814 setting the stall location as the new end stop location and stroke respanner 1818 automatically respanning the stroke. For example, stroke respanner 1818 may automatically shift the stroke so that a feedback signal of 0 V corresponds to the counterclockwise end stop location. In some instances, because the actuator and/or drive device may not be visible to the operator, the abnormal zero value of feedback signal 2006 may serve as an indication to the operator that an unexpected end stop has been encountered.

Between time $t_1$ and time $t_2$, while actuator position 2004 remains constant and drive device 510 is stalled, torque output 2002 and feedback signal 2006 are also held constant at their values at the point of stall (i.e., maximum value for torque output 2002, zero value for feedback signal 2006). During this period, the stall may prompt the initiation of the automatic stroke length recalibration process. In some embodiments, stall detector 1806 within the end stop locator 580 processing circuit may detect the stall and prompt end stop locator 1814 to set the location of the stall as a new end stop location.

At time $t_2$, drive device 510 begins to travel in a clockwise direction, which continues until time $t_3$. In response to travel in the clockwise direction, torque output 2002 immediately drops to its minimum value. Feedback signal 2006 begins to increase linearly with the actuator position 2004. However, the unexpected end stop recalibration process includes recalculating the stroke length based on the new end stop location and setting the maximum value of feedback signal 2006 in response to the recalculated stroke length. In other words, as graph 2000 illustrates drive device 510 approaching time $t_3$, feedback signal 2006 does not reach its expected maximum value of 10 V. Instead, because the unexpected end stop restricts drive device 510 to about 60% of its expected stroke length, feedback signal 2006 outputs a maximum value of about 6 V.

At time $t_3$, actuator position 2004 has reached the expected end stop at the end of travel in a clockwise direction. Between time $t_3$ and time $t_4$, actuator position 2004 reflects the normal stall at an expected end point before travel begins in the opposite direction, and feedback signal 2006 is held steady at the recalibrated value corresponding to the shortened stroke length. As previously described, the recalibrated value of feedback signal 2006 may serve as an indication to the operator that an unexpected end stop has been encountered.

At time $t_4$, drive device 510 again begins to travel in a counterclockwise direction. This continues until time $t_s$, when drive device 510 reaches the position of the unexpected end stop. As the expected end stop location is reached, the soft stall procedure is performed. Graph 2000 illustrates a scenario in which, at time $t_s$, the cause of the unexpected end stop is removed, cleaned, otherwise resolved, etc., such that the stroke of drive device 510 can resume its full stroke length. As illustrated by graph 2000, following time $t_s$, actuator position 2004 is no longer stalled at 30°, but may continue travel to the expected minimum value of 0°. However, at time $t_s$, feedback signal 2006 already has already reached its minimum value of 0 V. Between time $t_s$ and time $t_6$, the value of feedback signal 2006 is therefore held steady at 0 V, until actuator position 2004 reaches its minimum value of 0° and can resume travel in the clockwise direction.

At time $t_6$, drive device 510 resumes travel in a clockwise direction, which continues until time $t_7$. As illustrated by graph 2000, at time $t_7$, drive device 510 anticipates the unexpected end stop and the soft stall procedure is performed. At the same time, feedback signal 2006 approaches its recalibrated maximum value of 6 V, which corresponds to the maximum feedback signal based on the shortened stroke length. However, as the cause of the unexpected end stop has been removed, drive device 510 may drive past the unexpected end stop location until it reaches the expected end stop. The soft stall implementation causes the speed of drive device 510 to slow for a predetermined time (e.g., between two and four seconds) before resuming normal speed until drive device 510 reaches the expected end stop location. Because the soft stall technique was implemented at the unexpected end stop location (i.e., at time $t_7$) it is not implemented again at the expected end stop location. Likewise, feedback signal 2006 does not stall at a maximum value of 6 V, but instead continues to the normal maximum of 10 V as actuator position 2004 proceeds to the expected end stop location.

After drive device 510 reaches the expected end stop from the clockwise direction and begins to travel in the counter-clockwise direction, the stroke length of drive device 510 is unrestricted, and drive device 510 may travel between the expected end stops. The soft stall feature may resume implementation based on the expected end stops. The plots of torque output 2002, actuator position 2004, and feedback signal 2006 revert to the shapes and values associated with normal actuator operation (i.e., identical to the period prior to time $t_1$).

Automatic Stroke Length Recalibration Process

Figure 21:
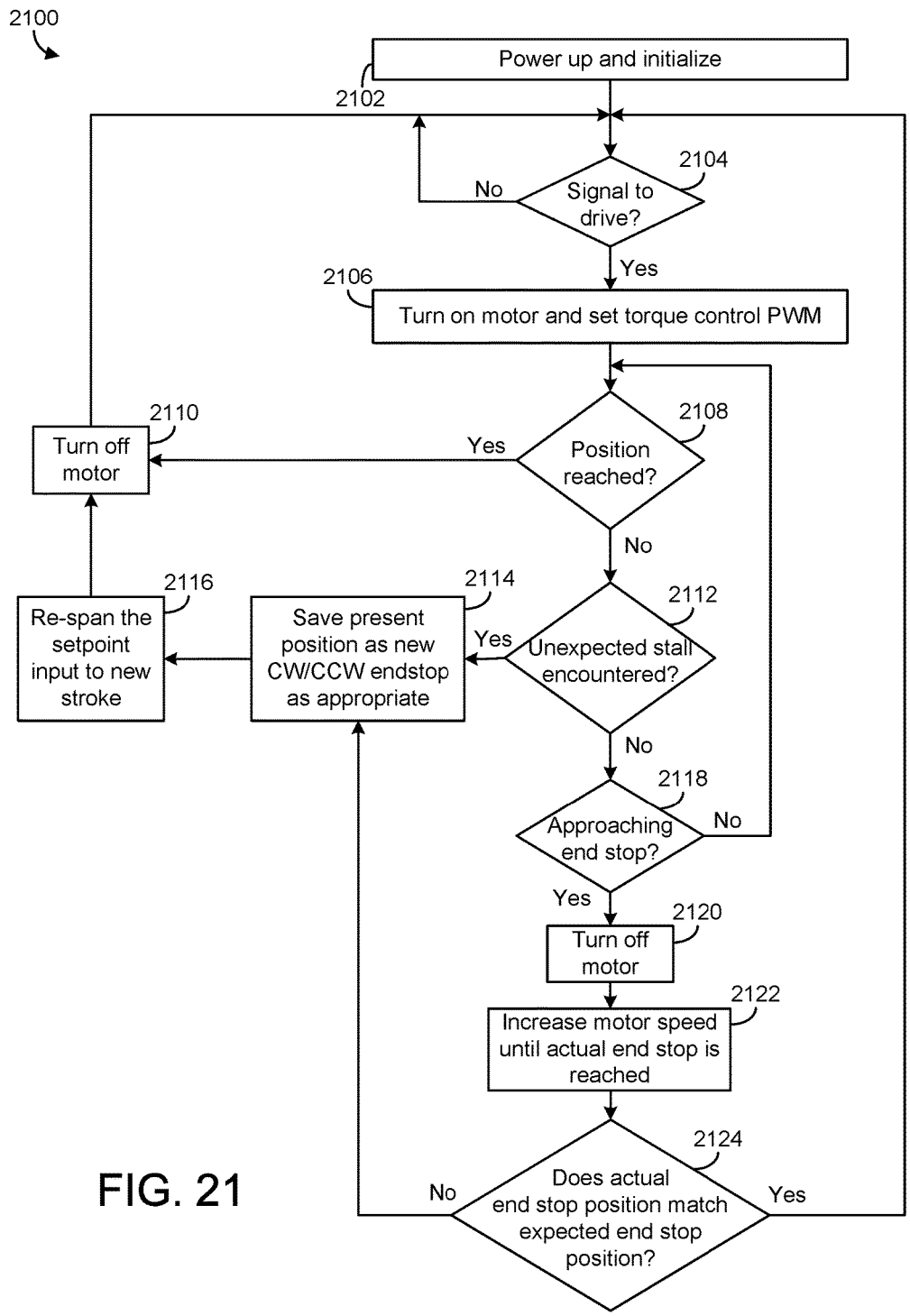
FIG. 21 is a flowchart of a stroke length recalibration process which may be performed by the actuator of FIGS. 5-7 when the stroke is an unexpected length, according to an exemplary embodiment.

Referring now to FIG. 21, a flowchart of a process 2100 for controlling a HVAC actuator is shown, according to an exemplary embodiment. In some embodiments, the HVAC actuator is the same or similar to actuator 500, as described with reference to FIGS. 5-13. The actuator may be a damper actuator, a valve actuator, a fan actuator, a pump actuator, or any other type of actuator that can be used in a HVAC system or BMS. The actuator may be a linear actuator (e.g., a linear proportional actuator), a non-linear actuator, a spring return actuator, or a non-spring return actuator. Process 2100 may be performed automatically by one or more components of a processing circuit (e.g., processing circuit 530) of the HVAC actuator to control a motor of the actuator (e.g., BLDC motor 550).

Process 2100 is shown to include powering up and initializing the actuator (step 2102) and determining whether a signal to drive the actuator is received (step 2104). The signal to drive the actuator may be received as a control signal (e.g., control signal 564) from a controller, a user device, or any other external system or device. The signal to drive the actuator may command the actuator to achieve a specified position and/or a specified operating speed. Step 2104 may be repeated periodically until a signal to drive the actuator is received.

Process 2100 is shown to include turning on the motor and setting the torque control PWM output (step 2106). In some embodiments, the motor is a brushless direct current (BLDC) motor such as BLDC motor 550. The motor may be coupled to a drive device (e.g., drive device 510), which may be connected to a movable HVAC component. The drive device may be configured to receive a shaft of a damper, a valve, or any other movable HVAC system component in order to drive (e.g., rotate) the shaft. Turning on the motor may cause a corresponding movement of the drive device, which causes the HVAC component to move.

Setting the torque control PWM output may include increasing the torque control PWM output to a startup value to allow an increased electric current to flow through the motor while the motor is started. In some embodiments, step 2106 includes determining whether the torque control PWM output is less than a predetermined startup value. If the torque control PWM is less than the predetermined startup value, the torque control PWM may be increased to the startup value. However, if the torque control PWM is greater than or equal to the startup value, the torque control PWM may not be increased further.

Process 2100 is shown to include determining whether the specified position has been reached (step 2108). The specified position may be included in the command or control signal received in step 2104. In some embodiments, step 2108 includes determining the position of the drive device. The position of the drive device may be determined using position signals from one or more position sensors (e.g., position sensors 552). The position sensors may be Hall effect sensors, potentiometers, optical sensors, or any other type of sensor configured to measure a position of the motor, the drive device, and/or the HVAC component connected to the drive device. The position of the drive device may be determined in terms of Hall sensor counts, motor revolutions, motor position, drive device position, or any other unit that can be used to quantify the position of the motor, the drive device, and/or the HVAC component. For example, the position of the drive device may be determined as a number of degrees of rotation of the drive device relative to a fixed position (e.g., a zero location, a mechanical end stop, etc.), a number of revolutions of the motor, a number of Hall sensor counts, etc.

The position of the drive device may be compared to the specified position received in step 2104 to determine whether the specified position has been reached. If the specified position has been reached, the motor may be turned off (step 2110). However, if the specified position has not been reached, process 2100 may proceed to determining whether the motor has unexpectedly stalled (step 2112).

If the motor has unexpectedly stalled (i.e., the mechanical end of travel has been reached), process 2100 is shown to include saving the motor/actuator's position at stall as a new end stop location for either clockwise or counterclockwise rotation (step 2114). Process 2100 may then proceed to operate the BLDC motor 550 in the opposite direction. Once another mechanical end of travel is reached, the motor/actuator's position may be recorded as another end stop location. By recording the updated end stop locations, the stroke length of the drive device may be recalculated, and setpoints dependent on end stop locations and stroke length (e.g., speed setpoint 566, position setpoint 1824, etc.) may be updated accordingly (step 2116). Once the setpoint input has been re-spanned to match the new stroke length, the speed control PWM output may be set to zero, which causes the motor to turn off (step 2110).

If the drive device does not encounter an unexpected stall condition, process 2100 is shown to include determining whether the drive device is approaching an end stop (step 2118). If the drive device is not approaching the end stop, process 2100 may return to step 2108. Steps 2108-2118 may be repeated until the drive device is within a predetermined distance of the end stop (i.e., the soft stall threshold). Once the drive device reaches the soft stall threshold, the speed control PWM output may be set to zero, which causes the motor to turn off (step 2120). The speed control PWM output may then be increased until the end stop is reached (step 2122). Increasing the speed control PWM output may cause the motor speed to increase as the drive device approaches the end stop.

Process 2100 is shown to include determining whether the position of the drive device once the end stop is reached matches the expected end stop position stored in the system memory (step 2124). For example, the end stop positions may be stored in end stop location memory 1802. If the position of the drive device at the mechanical end of travel and the position of the expected end stop match, process 2100 may return to step 2104 and await a signal to drive the actuator. If the position of the drive device does not match the expected end stop (i.e., the stroke length of the drive device is longer than expected), process 2100 may proceed to steps 2114 and 2116 to record the new end stop locations and re-span the setpoint input based on the new stroke length.

Figure 22:
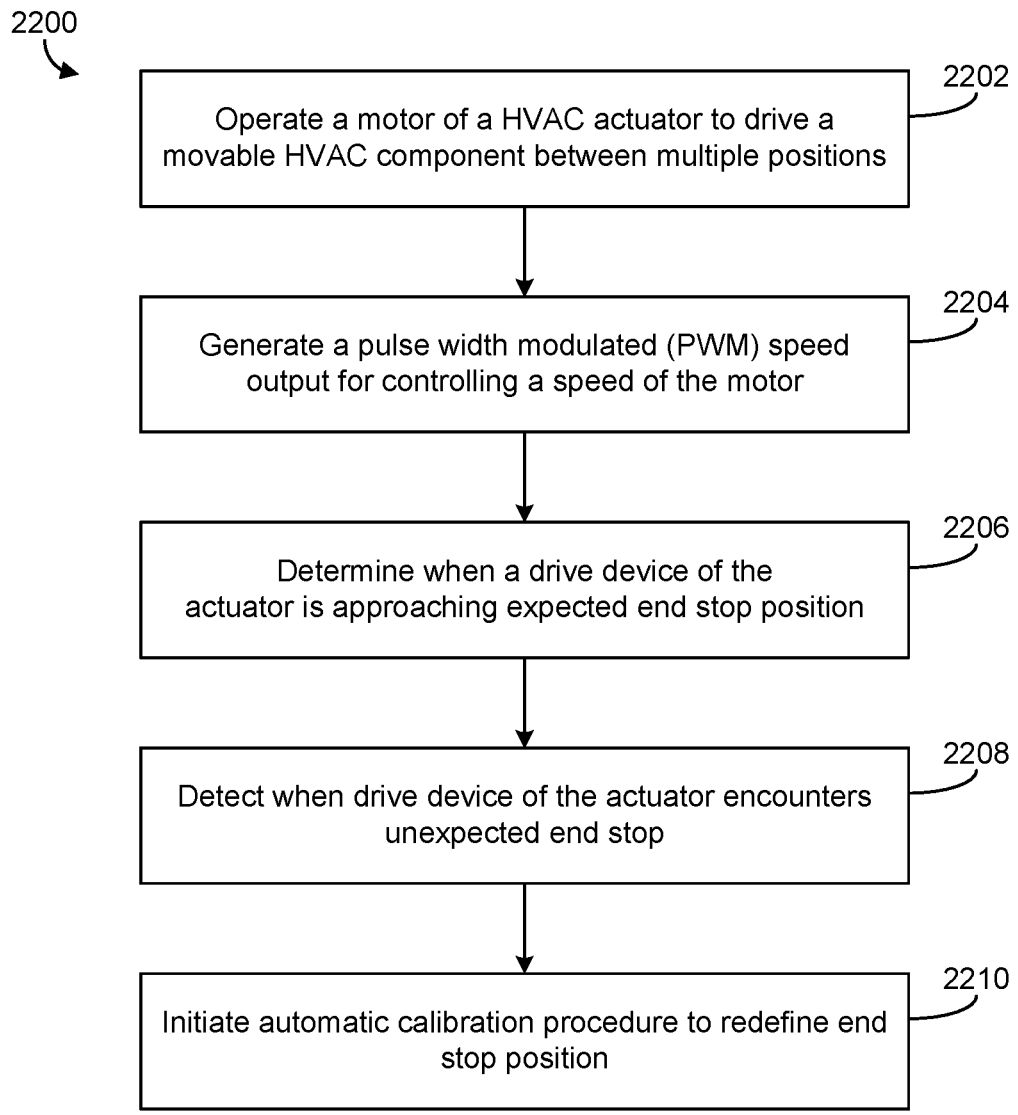
FIG. 22 is a flowchart of a stroke length recalibration process which may be performed by the actuator of FIGS. 5-7 when the stroke length is shorter than expected, according to an exemplary embodiment.

Referring now to FIG. 22, a flowchart of a process 2200 for automatic recalibration of a HVAC actuator stroke length when the stroke is shorter than expected is shown, according to an exemplary embodiment. In some embodiments, the HVAC actuator is the same or similar to actuator 500, as described with reference to FIGS. 5-13. The actuator may be a damper actuator, a valve actuator, a fan actuator, a pump actuator, or any other type of actuator that can be used in a HVAC system or BMS. The actuator may be a linear actuator (e.g., a linear proportional actuator), a non-linear actuator, a spring return actuator, or a non-spring return actuator. Process 2200 may be performed automatically by one or more components of a processing circuit (e.g., processing circuit 530) of the HVAC actuator to control a motor of the actuator (e.g., BLDC motor 550).

Process 2200 is shown to include operating a motor of a HVAC actuator to drive a movable HVAC component between multiple positions (step 2202). In some embodiments, the motor is a brushless direct current (BLDC) motor such as BLDC motor 550. The motor may be coupled to a drive device (e.g., drive device 510), which may be connected to the movable HVAC component. The drive device may be configured to receive a shaft of a damper, a valve, or any other movable HVAC system component in order to drive (e.g., rotate) the shaft. Operating the motor may cause a corresponding movement of the drive device, which causes the HVAC component to move between the multiple positions.

Process 2200 is shown to include generating a pulse width modulated (PWM) speed output for controlling a speed of the motor (step 2204). The PWM speed output may be a PWM DC voltage output (e.g., PWM output 554). In some embodiments, the PWM speed output is generated by a PWM speed controller such as PWM speed controller 538, as described with reference to FIGS. 8-13. The PWM speed output may be provided as an input to the motor. The duty cycle of the PWM speed output may determine the speed of the motor. The width of the PWM speed output's PWM pulses can be adjusted by the PWM speed controller to achieve varying commanded motor speeds and/or to obtain varying motor or actuator positions.

Process 2200 is shown to include determining when a drive device of the actuator is approaching an end stop (step 2206). Step 2206 may include determining that the drive device is approaching the end stop when the position of the drive device reaches a soft stall threshold (e.g., soft stall threshold 598). The soft stall threshold may be a predetermined distance from the location of the end stop. As such, step 2206 may include determining the position of the drive device, identifying the location of the end stop, generating the soft stall threshold based on the location of the end stop, and comparing the position of the drive device with the soft stall threshold.

In some embodiments, step 2206 includes determining the position of the drive device. The position of the drive device may be determined using position signals from one or more position sensors (e.g., position sensors 552). The position sensors may be Hall effect sensors, potentiometers, optical sensors, or any other type of sensor configured to measure a position of the motor, the drive device, and/or the HVAC component connected to the drive device. The position of the drive device may be determined in terms of Hall sensor counts, motor revolutions, motor position, drive device position, or any other unit that can be used to quantify the position of the motor, the drive device, and/or the HVAC component. For example, the position of the drive device may be determined as a number of degrees of rotation of the drive device relative to a fixed position (e.g., a zero location, a mechanical end stop, etc.), a number of revolutions of the motor, a number of Hall sensor counts, etc.

In some embodiments, step 2206 includes identifying the location of the end stop. The end stop may define end points on a physical range of movement for the drive device. The end stop may be software-defined (e.g., a user-defined location). If the end stop is a software-defined end stop, step 2206 may include identifying the end stop location by retrieving the end stop location from memory (e.g., end stop location memory 1802).

In some embodiments, step 2206 includes generating a soft stall threshold based on the location of the end stop. The soft stall threshold may be generated by adding or subtracting a predetermined value N from the end stop location. The predetermined value N may be a number of Hall counts, a number of motor revolutions, a number of degrees of rotation of the drive device, or any other unit in which the position of the drive device can be quantified. In some embodiments, the predetermined value N is approximately 99 Hall counts, which may translate into approximately three motor revolutions.

In some embodiments, step 2206 includes comparing the position of the drive device with the soft stall threshold. Step 2206 may determine that the drive device is approaching the end stop when the position of the drive device reaches the soft stall threshold. In some embodiments, step 2206 includes determining that the drive device is approaching the end stop when the drive device crosses the soft stall threshold while moving toward the end stop location.

Still referring to FIG. 22, process 2200 is shown to include detecting when a drive device of the actuator encounters an unexpected end stop (step 2208). An unexpected end stop may be caused by a mechanical obstruction (e.g., ice, other debris) which restricts the physical range of movement for the drive device. As such, step 2208 may include both determining the position of the drive device and detecting that the drive device has stalled.

In some embodiments, step 2208 includes determining the position of the drive device. As previously described, the position of the drive device may be detected using position signals and may be determined in terms of Hall sensor counts, motor revolutions, motor position, drive device position, or any other unit that can be used to quantify the position of the motor, the drive device, and/or the HVAC component. Step 2208 may also include determining that the drive device has stalled. In some instances, a determination that the motor has stalled may result when the motor/actuator position has not changed in a specified amount of time. In other instances, the determination that the motor has stalled may result when the motor/actuator speed is equal to zero.

Process 2200 is shown to include initiating the automatic calibration procedure to redefine the end stop positions (step 2210). In some instances, step 2210 may record the position at stall as a new end stop location for either clockwise or counterclockwise rotation. Process 2200 may then proceed to operate the BLDC motor 550 in the opposite direction. Once another mechanical end of travel is reached, the motor/actuator's position may be recorded as another end stop location. By recording the updated end stop locations, the stroke length of the drive device may be recalculated, and setpoints dependent on end stop locations and stroke length (e.g., speed setpoint 566, position setpoint 1824, etc.) may be updated accordingly.

Unlike techniques that require operator input to run a calibration procedure, process 2200 is fully automated. Once an unexpected end stop is detected, process 2200 may automatically redefine end stop positions and recalculate the stroke length of the drive device of the actuator. Because the soft stall thresholds are calculated based on the expected updatable locations of the end stops, the motor speed of the drive device may be controlled based on live conditions of the drive device, rather than relying solely on fixed end stop locations pre-programmed in software. Advantageously, process 2200 may reduce the impulse force seen at the mechanical end stop, thereby increasing the longevity of the mechanical gear train.

Figure 23:
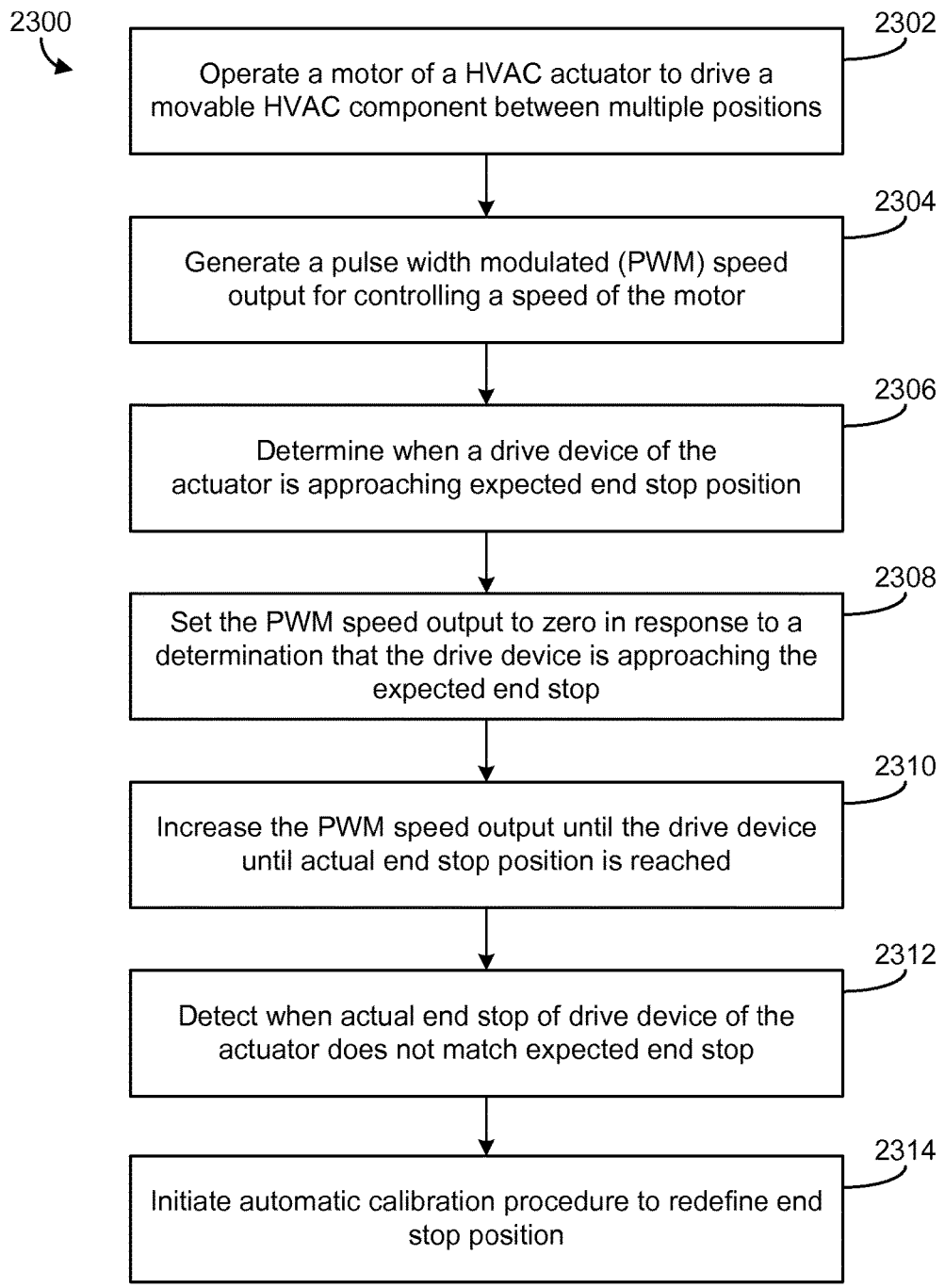
FIG. 23 is a flowchart of a stroke length recalibration process which may be performed by the actuator of FIGS.

Referring now to FIG. 23, a flowchart of a process 2300 for automatic recalibration of a HVAC actuator stroke length when the stroke is longer than expected is shown, according to an exemplary embodiment. In some embodiments, the HVAC actuator is the same or similar to actuator 500, as described with reference to FIGS. 5-13. The actuator may be a damper actuator, a valve actuator, a fan actuator, a pump actuator, or any other type of actuator that can be used in a HVAC system or BMS. The actuator may be a linear actuator (e.g., a linear proportional actuator), a non-linear actuator, a spring return actuator, or a non-spring return actuator. Process 2300 may be performed by a processing circuit (e.g., processing circuit 530) of the HVAC actuator to control a motor of the actuator (e.g., BLDC motor 550). Process 2300 may be performed automatically by one or more components of processing circuit 530, as described with reference to FIGS. 5-13.

Process 2300 is shown to include operating a motor of a HVAC actuator to drive a movable HVAC component between multiple positions (step 2302). In some embodiments, the motor is a brushless direct current (BLDC) motor such as BLDC motor 550. The motor may be coupled to a drive device (e.g., drive device 510), which may be connected to the movable HVAC component. The drive device may be configured to receive a shaft of a damper, a valve, or any other movable HVAC system component in order to drive (e.g., rotate) the shaft. Operating the motor may cause a corresponding movement of the drive device, which causes the HVAC component to move between the multiple positions.

Process 2300 is shown to include generating a pulse width modulated (PWM) speed output for controlling a speed of the motor (step 2304). The PWM speed output may be a PWM DC voltage output (e.g., PWM output 554). In some embodiments, the PWM speed output is generated by a PWM speed controller such as PWM speed controller 538, as described with reference to FIGS. 8-13. The PWM speed output may be provided as an input to the motor. The duty cycle of the PWM speed output may determine the speed of the motor. The width of the PWM speed output's PWM pulses can be adjusted by the PWM speed controller to achieve varying commanded motor speeds and/or to obtain varying motor or actuator positions.

Process 2300 is shown to include determining when a drive device of the actuator is approaching an end stop (step 2306). Step 2306 may include determining that the drive device is approaching the end stop when the position of the drive device reaches a soft stall threshold (e.g., soft stall threshold 598). The soft stall threshold may be a predetermined distance from the location of the end stop. As such, step 2306 may include determining the position of the drive device, identifying the location of the end stop, generating the soft stall threshold based on the location of the end stop, and comparing the position of the drive device with the soft stall threshold.

In some embodiments, step 2306 includes determining the position of the drive device. The position of the drive device may be determined using position signals from one or more position sensors (e.g., position sensors 552). The position sensors may be Hall effect sensors, potentiometers, optical sensors, or any other type of sensor configured to measure a position of the motor, the drive device, and/or the HVAC component connected to the drive device. The position of the drive device may be determined in terms of Hall sensor counts, motor revolutions, motor position, drive device position, or any other unit that can be used to quantify the position of the motor, the drive device, and/or the HVAC component. For example, the position of the drive device may be determined as a number of degrees of rotation of the drive device relative to a fixed position (e.g., a zero location, a mechanical end stop, etc.), a number of revolutions of the motor, a number of Hall sensor counts, etc.

In some embodiments, step 2306 includes identifying the location of the end stop. The end stop may define end points on a physical range of movement for the drive device. The end stop may be software-defined (e.g., a user-defined location). If the end stop is a software-defined end stop, Step 2306 may include identifying the end stop location by retrieving the end stop location from memory (e.g., end stop location memory 1802).

In some embodiments, step 2306 includes generating a soft stall threshold based on the location of the end stop. The soft stall threshold may be generated by adding or subtracting a predetermined value N from the end stop location. The predetermined value N may be a number of Hall counts, a number of motor revolutions, a number of degrees of rotation of the drive device, or any other unit in which the position of the drive device can be quantified. In some embodiments, the predetermined value N is approximately 99 Hall counts, which may translate into approximately three motor revolutions.

In some embodiments, step 2306 includes comparing the position of the drive device with the soft stall threshold. Step 2306 may determine that the drive device is approaching the end stop when the position of the drive device reaches the soft stall threshold. In some embodiments, step 2306 includes determining that the drive device is approaching the end stop when the drive device crosses the soft stall threshold while moving toward the end stop location.

Still referring to FIG. 23, process 2300 is shown to include setting the PWM speed output to zero in response to a determination that the drive device is approaching the end stop (step 2308). Step 2308 may include setting the magnitude of the PWM speed output to zero, preventing the PWM speed output from reaching the motor, or otherwise interrupting or changing the PWM speed output such that the motor receives zero input voltage across the motor's windings. Setting the PWM speed output to zero may stop motor commutation, which causes the motor to stop. In some embodiments, step 2306 includes providing a speed setpoint of zero to the PWM speed controller. The PWM speed controller may use the zero speed setpoint to set the PWM speed output to a duty cycle of 0%.

Process 2300 is shown to include increasing the PWM speed output until the actual end stop is reached (step 2310). In some embodiments, step 2310 is performed in response to a determination that the motor has stopped after the PWM speed output is set to zero. Step 2310 may include ramping-up the PWM speed output linearly (as shown in FIG. 14.), nonlinearly, or otherwise increasing the PWM speed output (e.g., in a step-wise manner). In some embodiments, the PWM speed output is increased continuously or incrementally. Increasing the PWM speed output may cause the motor speed to increase.

In some embodiments, step 2310 includes increasing the PWM speed output until the actual end stop is reached, which may occur at a position beyond the expected end stop location. To determine that an end stop has been reached, step 2310 may include monitoring the position and/or speed of the motor and/or actuator. In some embodiments, step 2310 may use motor/actuator position 592 to detect a stall in drive device 510 when the motor/actuator position has not changed for a specified period of time. In other embodiments, step 2310 may detect a stall when motor/actuator speed 594 is equal to zero. In response to the detection of a stall, step 2310 may record the position of stall as an end stop location.

Still referring to FIG. 23, process 2300 is shown to include detecting when the actual end stop of drive device 510 does not match the expected end stop location (step 2312). After the actual end stop location has been recorded in step 2310, step 2312 may compare the actual end stop location to the expected end stop location. In some instances, step 2312 may include retrieving the expected end stop location from memory (e.g., end stop location memory 1802). If the actual end stop location does not match the expected end stop location, step 2314 may initiate an automatic calibration procedure.

Process 2300 is shown to include initiating the automatic calibration procedure to redefine the end stop positions (step 2314). In some instances, step 2314 may record the position at stall as a new end stop location for either clockwise or counterclockwise rotation. Process 2300 may then proceed to operate the BLDC motor 550 in the opposite direction. Once another mechanical end of travel is reached, the motor/actuator's position may be recorded as another end stop location. By recording the updated end stop locations, the stroke length of the drive device may be recalculated, and setpoints dependent on end stop locations and stroke length (e.g., speed setpoint 566, position setpoint 1824, etc.) may be updated accordingly.

Unlike techniques that require operator input to run a calibration procedure, process 2300 is fully automated. Once an unexpected end stop is detected, process 2300 may automatically redefine end stop positions and recalculate the stroke length of the drive device of the actuator. Because the soft stall thresholds are calculated based on the locations of the end stops, the motor speed of the drive device may be controlled based on live conditions of the drive device, rather than relying solely on end stop locations pre-programmed in software. Advantageously, process 2300 may reduce the impulse force seen at the mechanical end stop, thereby increasing the longevity of the mechanical gear train.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An actuator in a HVAC system, the actuator comprising:
  a motor;
  a drive device driven by the motor and coupled to a movable HVAC component for driving the movable HVAC component between multiple positions bounded by one or more end stops; and
  a main actuator controller comprising:
    end stop location memory that stores one or more end stop locations indicating expected locations of the one or more end stops; and
    an end stop location recalibrator that runs an automatic recalibration process to determine and set recalibrated end stop locations in response to detecting that the drive device has unexpectedly stalled at a location other than a stored end stop location.

2. The actuator of claim 1, wherein the drive device unexpectedly stalls prior to reaching a stored end stop location.

3. The actuator of claim 1, wherein the drive device proceeds through a stored end stop location and unexpectedly stalls at a location beyond the stored end stop location.

4. The actuator of claim 1, wherein the main actuator controller further comprises a stall detector that detects when the drive device has stalled and records the location of the drive device at stall.

5. The actuator of claim 4, wherein the main actuator controller further comprises a comparator that compares the stored end stop locations to the location of the drive device at stall and automatically initiates an automatic recalibration process in response to a determination that the location of the drive device at stall does not match any of the stored end stop locations.

6. The actuator of claim 1, wherein the main actuator controller further comprises a stroke respanner that calculates an adjusted stroke length of the actuator based on the recalibrated end stop locations.

7. The actuator of claim 6, wherein the main actuator controller further comprises a setpoint adjuster that receives an actuator position setpoint and adjusts the actuator position setpoint based on the adjusted stroke length.

8. The actuator of claim 1, further comprising one or more position sensors that measure a position of at least one of the drive device, the motor, and the movable HVAC component;
wherein the main actuator controller determines that the drive device is approaching a stored end stop location using feedback from the position sensors.

9. The actuator of claim 8, further comprising a threshold calculator that receives the stored end stop location from the end stop location memory and generates a soft stall threshold using the expected end stop location.

10. The actuator of claim 9, further comprising a comparator that compares the measured position with the soft stall threshold and generates a soft stall signal indicating the drive device is approaching the stored end stop location in response to the measured position reaching the soft stall threshold.

11. A method for controlling a HVAC actuator that includes a motor and a drive device driven by the motor and coupled to a movable HVAC component, the method comprising:
operating the motor to drive the movable HVAC component between multiple positions bounded by one or more end stops;
retrieving stored end stop locations from end stop location memory; and
automatically initiating an automatic calibration procedure to determine and set recalibrated end stop locations in response to detecting that the drive device has unexpectedly stalled at a location other than a stored end stop location.

12. The method of claim 11, further comprising detecting when the drive device unexpectedly stalls prior to reaching a stored end stop location.

13. The method of claim 11, further comprising detecting when the drive device proceeds through a stored end stop location and unexpectedly stalls at a location beyond the stored end stop location.

14. The method of claim 11, further comprising:
detecting that the drive device has encountered an unexpected end stop by determining when the drive device has stalled; and
recording the location of the drive device at stall.

15. The method of claim 14, further comprising comparing the stored end stop locations to the location of the drive device at stall and automatically initiating an automatic recalibration process in response to a determination that the locations do not match.

16. The method of claim 11, further comprising recalculating an adjusted stroke length of the actuator based on the recalibrated end stop locations.

17. The method of claim 16, further comprising receiving an actuator position setpoint and adjusting the actuator position setpoint input based on the adjusted stroke length.

18. The method of claim 11, further comprising using one or more position sensors to measure a position of at least one of the drive device, the motor, and the movable HVAC component;
wherein determining that the drive device is approaching the stored end stop location comprises using feedback from the position sensors.

19. The method of claim 18, further comprising using the location of the stored end stop to generate a soft stall threshold.

20. The method of claim 19, further comprising:
comparing the measured position with the soft stall threshold; and
generating a soft stall signal indicating that the drive device is approaching the stored end stop location in response to the measured position reaching the soft stall threshold.

* * * * *